(12) United States Patent
Ying

(10) Patent No.: US 12,267,734 B2
(45) Date of Patent: Apr. 1, 2025

(54) COMMUNICATION METHOD AND COMMUNICATIONS APPARATUS

(71) Applicant: Huawei Technologies Co., Ltd., Shenzhen (CN)

(72) Inventor: Jiangwei Ying, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 446 days.

(21) Appl. No.: 17/726,932

(22) Filed: Apr. 22, 2022

(65) Prior Publication Data

US 2022/0248290 A1 Aug. 4, 2022

Related U.S. Application Data

(63) Continuation of application No. 16/878,543, filed on May 19, 2020, now Pat. No. 11,323,931, which is a
(Continued)

(30) Foreign Application Priority Data

Nov. 21, 2017 (CN) .......................... 201711166063.4

(51) Int. Cl.
H04W 36/08 (2009.01)
H04W 36/00 (2009.01)

(52) U.S. Cl.
CPC ............... H04W 36/0033 (2013.01)

(58) Field of Classification Search
CPC ......... H04W 36/0033; H04W 36/0022; H04W 36/0016; H04W 36/14; H04W 36/0011;
(Continued)

(56) References Cited

U.S. PATENT DOCUMENTS

2009/0109899 A1 4/2009 Hamada
2011/0103223 A1 5/2011 Dhillon et al.
(Continued)

FOREIGN PATENT DOCUMENTS

CN 102448115 A 5/2012
CN 103428822 A 12/2013
(Continued)

OTHER PUBLICATIONS

3GPP TS 23.228 V15.0.0, Sep. 2017, 3rd Generation Partnership Project; Technical Specification Group Services and System Aspects; IP Multimedia Subsystem (IMS); Stage 2 (Release 15), 328 pages.
(Continued)

Primary Examiner — Allahyar Kasraian
(74) Attorney, Agent, or Firm — Conley Rose, P.C.

(57) ABSTRACT

A method in which a terminal device moves from a first AN node to a second AN node, where the method includes: receiving identification information of a to-be-activated session from the terminal device via the second AN node; sending a context release command to the first AN node when a signaling connection of the terminal device exits between an AMF node and the first AN node; receiving a context release complete message carrying identification information of an active session of the terminal device from the first AN node; when the to-be-activated session and the active session have a same session, sending a first request message to request to deactivate the same session to an SMF node corresponding to the same session; and after the same session is deactivated, sending, to the SMF node, a second request message to request to activate the same session.

15 Claims, 12 Drawing Sheets

Related U.S. Application Data continuation of application No. PCT/CN2018/116695, filed on Nov. 21, 2018.

(58) Field of Classification Search
CPC ..... H04W 36/08; H04W 36/00; H04W 36/12; H04W 36/38; H04W 36/0055
See application file for complete search history.

(56) References Cited

U.S. PATENT DOCUMENTS

| | | | |
|---|---|---|---|
| 2013/0195268 | A1 | 8/2013 | Norrman et al. |
| 2014/0023040 | A1 | 1/2014 | Son et al. |
| 2017/0288972 | A1 | 10/2017 | Li et al. |
| 2017/0289898 | A1 | 10/2017 | Youn et al. |
| 2017/0332421 | A1 | 11/2017 | Sternberg et al. |
| 2018/0199398 | A1 | 7/2018 | Dao et al. |
| 2018/0376444 | A1 | 12/2018 | Kim et al. |
| 2019/0098537 | A1 | 3/2019 | Qiao et al. |
| 2019/0159227 | A1* | 5/2019 | Talebi Fard ...... H04W 36/0011 |
| 2020/0037205 | A1* | 1/2020 | Ying ...................... H04W 76/10 |
| 2020/0120570 | A1* | 4/2020 | Youn ........................ H04W 8/08 |
| 2021/0211960 | A1 | 7/2021 | Ryu et al. |
| 2023/0164881 | A1* | 5/2023 | Velev .................... H04W 76/27 370/329 |

FOREIGN PATENT DOCUMENTS

| | | |
|---|---|---|
| EP | 3508004 A1 | 7/2019 |
| EP | 3557905 A1 | 10/2019 |
| WO | 2017142362 A1 | 8/2017 |
| WO | 2017167247 A1 | 10/2017 |
| WO | 2018127190 A1 | 7/2018 |
| WO | 2019033532 A1 | 2/2019 |

OTHER PUBLICATIONS

Ericsson, "Description of SM information and PDU Session ID on N11 and N1," SA WG2 Meeting #121, S2-173005, May 15-19, 2017, Hangzhou, China, 27 pages.

SA WG2 Meeting #120,S2-172174,TS23.502: Selective deactivation of UP connection of existing POU session ETRI,Mar. 27-31, 2017, Busan, Korea, 3 pages.

SA WG2 Meeting #122bis,S2-176081,TS 23.502: POU session deactivation due to mobility restriction,CATT,Aug. 21 25, 2017, Sophia Antipolis, France, 5 pages.

Huawei et al.,"TS 23.502—Minimizing handover signalling overhead for POU sessions having no data activity",SA WG2 Meeting #120,S2-172003,Mar. 27-31, 2017, Busan, Korea, total 14 pages.

3GPP TS 23.501 V1.5.0 (Nov. 2017),3rd Generation Partnership Project;Technical Specification Group Services and System Aspects-;System Architecture for the 5G System;Stage 2(Release 15), total 170 pages.

3GPP TS 23.502 V1.3.0 (Nov. 2017),3rd Generation Partnership Project;Technical Specification Group Services and System Aspects;Procedures for the 5G System;Stage 2{Release 15), total 215 pages.

3GPP TS 36.331 V12.15.1 (Sep. 2017),3rd Generation Partnership Project;Technical Specification Group Radio Access Network;Evolved Universal Terrestrial Radio Access (E-UTRA);Radio Resource Control (RRC);Protocol specification Release 12), total 459 pages.

3GPP TS 38.331 V0.1.0 (Oct. 2017),3rd Generation Partnership Project;Technical Specification Group Radio Access Network;NR-;Radio Resource Control {RRC);Protocol specification(Release 15), total 42 pages.

3GPP TS 38.413 V0.4.0 (Oct. 2017),3rd Generation Partnership Project;Technical Specification Group Radio Access Network;NG Radio Access Network(NG-RAN);NG Application Protocol (NGAP)(Release 15), total 88 pages.

Huawei, et al., TS 23.502—Minimizing handover signalling overhead for POU sessions having no data activity. SA WG2 Meeting #120, Mar. 27-31, 2017, Busan, Korea, S2-172652, 6 pages.

CATT, TS 23.502, "PDU session deactivation Procedure," SA WG2 Meeting #S2-122, Jun. 26-30, 2017, San J Del Cabo, S2-174631, 2 pages.

"3rd Generation Partnership Project; Technical Specification Group Core Network and Terminals; 5G System; Technical Realization of Service Based Architecture; Stage 3 (Release 15)," 3GPP TS 29.500 V0.2.0, Oct. 2017, 10 pages.

"3rd Generation Partnership Project; Technical Specification Group Services and System Aspects; Security Architecture and Procedures for 5G System (Release 15)," 3GPP TS 33.501 V0.4.0 Oct. 2017, 70 pages.

"3rd Generation Partnership Project; Technical Specification Group Core Network and Terminals; Non-Access-Stratum (NAS) protocol for 5G System (5GS); Stage 3 (Release 15)," 3GPP TS 24.501 V0.1.0, Nov. 2017, 16 pages.

Huawei, HiSilicon, TS 23.502 SMF information context synchronization between old AMF and new AMF. SA WG2 Meeting #122B, Aug. 21-25, 2017, Sophia Antipolis, France, S2-175643, 17 pages.

* cited by examiner

COMMUNICATION METHOD AND COMMUNICATIONS APPARATUS

CROSS-REFERENCE TO RELATED APPLICATIONS

This application is a continuation of U.S. patent application Ser. No. 16/878,543, filed on May 19, 2020, which is a continuation of International Patent Application No. PCT/CN2018/116695, filed on Nov. 21, 2018, which claims priority to Chinese Patent Application No. 201711166063.4, filed on Nov. 21, 2017. All of the aforementioned patent applications are hereby incorporated by reference in their entireties.

TECHNICAL FIELD

This application relates to the field of communications technologies, and in particular, to a communication method and a communications apparatus.

BACKGROUND

With upgrade of mobile communications technologies, many innovative applications are certainly brought for various industries, and mobile broadband, multimedia, machine type communication (MTC), industrial control, and an intelligent transportation system (ITS) are to become main use cases in a $5^{th}$ generation (5G) communications system.

In the 5G communications system, a session is used to carry service data. When no available session exists, a terminal device needs to initiate a session establishment procedure, to establish a proper session to carry service data. When an available session exists but the session is in a deactivated state, a terminal device initiates a session activation procedure to activate the session. When an available session exists and the session is in an active state, a terminal device may directly transfer service data using the session. If the session has no service data to be transferred, the session may be deactivated. Certainly, there may alternatively be a case in which a session is deactivated due to another factor. For example, a wireless connection between an access network node and the terminal device is lost.

It may be learned that whether session activation succeeds directly affects whether a service can be normally transmitted. To meet a widely changing service requirement, a success rate of the session activation needs to be further improved.

SUMMARY

Embodiments of this application provide a communication method and a communications apparatus, to improve a success rate of session activation.

According to a first aspect, a communication method is provided. The method is applied to a scenario in which a terminal device moves from a first access network (AN) node to a second AN node. The method includes: receiving, by an access control and mobility management function (AMF) node, identification information of a to-be-activated session from the terminal device using the second AN node; sending, by the AMF node, a context release command to the first AN node when a signaling connection of the terminal device exits between the AMF node and the first AN node, where the context release command is used to instruct to release a context of the terminal device; receiving, by the AMF node, a context release complete message from the first AN node, where the context release complete message carries identification information of an active session of the terminal device; when the to-be-activated session and the active session have a same session, sending, by the AMF node, a first request message to a session management function (SMF) node corresponding to the same session, where the first request message is used to request to deactivate the same session; and sending, by the AMF node, a second request message to the SMF node after the same session is deactivated, where the second request message is used to request to activate the same session. In the method, after receiving the identification information of the to-be-activated session from the terminal device using the second AN node, the AMF node does not immediately send, to an SMF node, a message used to request to activate the session. Instead, the AMF node releases the signaling connection when the signaling connection of the terminal device exists between the AMF node and the first AN node. For example, the AMF node sends the context release command to the first AN node, and receives the identification information of the active session of the terminal device. When the active session and the to-be-activated session have the same session, the AMF node first requests to deactivate the same session and then requests to activate the same session. In this way, an activation failure problem caused in other approaches because it is requested to deactivate a session just after it is requested to activate the session is resolved, thereby improving a success rate of session activation and improving user experience.

According to a second aspect, a communication method is provided. The method is applied to a scenario in which a terminal device moves from a first AN node to a second AN node. The method includes: receiving, by an AMF node, identification information of a to-be-activated session from the terminal device using the second AN node; sending, by the AMF node, a context release command to the first AN node when a signaling connection of the terminal device exits between the AMF node and the first AN node, where the context release command is used to instruct to release a context of the terminal device; receiving, by the AMF node, a context release complete message from the first AN node, where the context release complete message carries identification information of an active session of the terminal device; and when the to-be-active session and the active session have a same session, sending, by the AMF node, a first request message to an SMF node corresponding to the same session, where the first request message is used to request to activate the same session, or the first request message is used to request to first deactivate the same session and then reactivate the same session. In the method, after receiving the identification information of the to-be-activated session from the terminal device using the second AN node, the AMF node does not immediately send, to an SMF node, a message used to request to activate the session. Instead, the AMF node releases the signaling connection when the signaling connection of the terminal device exists between the AMF node and the first AN node. For example, the AMF node sends the context release command to the first AN node, and receives the identification information of the active session of the terminal device. When the active session and the to-be-activated session have the same session, the AMF node first requests to deactivate the same session and then requests to activate the same session, or the AMF node requests to activate the same session. In this way, an activation failure problem caused in other approaches because it is requested to deactivate a session just after it is requested to activate the session is resolved, thereby improving a success rate of session activation and improving user experience.

With reference to the second aspect, in a first implementation of the second aspect, the method further includes: when the to-be-activated session and the active session have a different session, sending, by the AMF node, a second request message to an SMF node corresponding to a session that is in the to-be-activated session but not in the active session, and sending a third request message to an SMF node corresponding to a session that is in the active session but not in the to-be-activated session.

The second request message is used to request to activate the session that is in the to-be-activated session but not in the active session, and the third request message is used to request to deactivate the session that is in the active session but not in the to-be-activated session. According to the method, activation or deactivation is implemented on the different session.

With reference to the second aspect, in a second implementation of the second aspect, when the first request message is used to request to activate the same session, the first request message carries deletion indication information, and the deletion indication information is used to indicate to delete (radio) access network (R)AN tunnel information of the same session. In other words, before the same session is activated, the (R)AN tunnel information of the session is deleted. In this way, a data transmission failure caused because a user plane function (UPF) node sends data of the terminal device to the first AN node based on the information is avoided.

According to a third aspect, a communication method is provided. The method is applied to a scenario in which a terminal device moves from a first AN node to a second AN node. The method includes: receiving, by an AMF node using the second AN node, identification information of a to-be-activated session from the terminal device; sending, by the AMF node, a first request message to an SMF node based on the identification information of the to-be-activated session, where the first request message is used to request to activate the to-be-activated session; sending, by the AMF node, a context release command to the first AN node when a signaling connection of the terminal device exists between the AMF node and the first AN node, where the context release command is used to instruct to release a context of the terminal device; receiving, by the AMF node, a context release complete message from the first AN node, where the context release complete message carries identification information of an active session of the terminal device; and when the to-be-activated session and the active session have a same session, skipping, by the AMF node, sending a second request message to an SMF node corresponding to the same session, where the second request message is used to request to deactivate the same session. In the method, after receiving the identification information of the to-be-activated session from the terminal device using the second AN node, the AMF node immediately requests the SMF node to activate the session. The AMF node releases the signaling connection when the signaling connection of the terminal device exists between the AMF node and the first AN node. For example, the AMF node sends the context release command to the first AN node, and receives the identification information of the active session of the terminal device. When the active session and the to-be-activated session have the same session, the AMF node no longer requests to deactivate the same session. In this way, an activation failure problem caused in other approaches because it is requested to deactivate a session just after it is requested to activate the session is resolved, thereby improving a success rate of session activation and improving user experience.

According to a fourth aspect, a communication method is provided. The method is applied to a scenario in which a terminal device moves from a first AN node to a second AN node. The first AN node is managed by a first AMF node, and the second AN node is managed by a second AMF node. The method includes: receiving, by the first AMF node, a first request message from the second AMF node, where the first request message is used to request a mobility management (MM) context of the terminal device; sending, by the first AMF node, a context release command to the first AN node when a signaling connection of the terminal device exists between the first AMF node and the first AN node, where the context release command is used to instruct to release a context of the terminal device; receiving, by the first AMF node, a context release complete message from the first AN node, where the context release complete message carries identification information of an active session of the terminal device; sending, by the first AMF node, a second request message to an SMF node corresponding to the active session, where the second request message is used to request to deactivate the active session; and sending, by the first AMF node, a first response message to the second AMF node after the active session is deactivated, where the first response message carries the MM context of the terminal device. In the method, the first AMF node receives, from the second AMF node, a message used to request the context of the terminal device. The first AMF node releases the signaling connection when the signaling connection of the terminal device exists between the first AMF node and the first AN node. For example, after sending the context release command to the first AN node and receiving the identification information of the active session of the terminal device, the first AMF node requests the SMF node to deactivate the active session, and sends the context of the terminal device to the second AMF node after the deactivation succeeds, such that the corresponding session has been successfully deactivated when the second AMF node receives the context of the terminal device and then requests to activate the session. In this way, an activation failure problem caused in other approaches because it is requested to deactivate a session just after it is requested to activate the session is resolved, thereby improving a success rate of session activation and improving user experience.

According to a fifth aspect, a communication method is provided. The method is applied to a scenario in which a terminal device moves from a first AN node to a second AN node. The first AN node is managed by a first AMF node, and the second AN node is managed by a second AMF node. The method includes: receiving, by the first AMF node, a first request message from the second AMF node, where the first request message is used to request a mobility management context of the terminal device, and where the first request message carries identification information of a to-be-activated session of the terminal device; sending, by the first AMF node, a context release command to the first AN node when a signaling connection of the terminal device exists between the first AMF node and the first AN node, where the context release command is used to instruct to release a context of the terminal device; receiving, by the first AMF node, a context release complete message from the first AN node, where the context release complete message carries identification information of an active session of the terminal device; and sending, by the first AMF node, a first response message to the second AMF node, where the first response message carries the mobility management context of the terminal device. In the method, the first AMF node receives, from the second AMF node, a message used to request the context of the terminal device. The message carries the identification information of the to-be-activated session. The first AMF node releases the signaling connection when the signaling connection of the terminal device exists between the first AMF node and the first AN node. For example, the first AMF node sends the context release command to the first AN node, and sends the context of the terminal device to the second AMF node after receiving the context release complete message. In this way, the second AMF node does not request an SMF node to activate a to-be-activated session just after the second AMF node receives an identifier of the session, thereby improving a success rate of session activation and improving user experience. In addition, based on the identification information of the to-be-activated session, the first AMF node does not request the SMF node to deactivate the to-be-activated session. In this way, an activation failure problem caused in other approaches because it is requested to deactivate a session just after it is requested to activate the session is resolved.

With reference to the fifth aspect, in a first implementation of the fifth aspect, when the to-be-activated session and the active session have a same session, the first response message further carries identification information of the same session; or when the to-be-activated session and the active session do not have a same session, the first response message further carries indication information, and the indication information is used to indicate that the to-be-activated session and the active session do not have the same session, where the identification information of the same session may be used by the second AMF node to request the SMF node to perform special processing, for example, delete (R)AN tunnel information corresponding to the same session.

With reference to the fifth aspect, in a second implementation of the fifth aspect, the first response message further carries the identification information of the active session. The identification information of the active session may be used by the second AMF node to determine whether the active session and the to-be-activated session have the same session, and the second AMF node may further request the SMF node to perform special processing, for example, delete (R)AN tunnel information corresponding to the same session.

With reference to the fifth aspect or either of the foregoing implementations of the fifth aspect, in a third implementation of the fifth aspect, the method further includes: when the to-be-activated session and the active session have a different session, sending, by the first AMF node, a second request message to an SMF node corresponding to a session that is in the active session but not in the to-be-activated session, where the second request message is used to request to deactivate the session that is in the active session but not in the to-be-activated session. In this way, the deactivation on the different session is implemented.

According to a sixth aspect, a communication method is provided. The method is applied to a scenario in which a terminal device moves from a first AN node to a second AN node. The first AN node is managed by a first AMF node, and the second AN node is managed by a second AMF node. The method includes: sending, by the second AMF node, a first request message to the first AMF node, where the first request message is used to request a mobility management context of the terminal device, and the first request message carries identification information of a to-be-activated session of the terminal device; and receiving, by the second AMF node, a first response message from the first AMF node, where the first response message carries the mobility management context of the terminal device. Based on the identification information of the to-be-activated session, the first AMF node does not request an SMF node to deactivate the to-be-activated session. In this way, an activation failure problem caused in other approaches because it is requested to deactivate a session just after it is requested to activate the session is resolved.

With reference to the sixth aspect, in a first implementation of the sixth aspect, the first response message further carries identification information of an active session of the terminal device, and the method further includes: when the to-be-activated session and the active session have a same session, sending, by the second AMF node, a second request message to an SMF node corresponding to the same session. The second request message is used to request to activate the same session; or the second request message is used to request to activate the same session, the second request message carries deletion indication information, and the deletion indication information is used to indicate to delete (radio) access network (R)AN tunnel information of the same session; or the second request message is used to request to first deactivate the same session and then reactivate the same session.

With reference to the sixth aspect, in a second implementation of the sixth aspect, the first response message further carries identification information of a same session, the same session is a session between the to-be-activated session and an active session of the terminal device, and the method further includes: sending, by the second AMF node, a second request message to an SMF node corresponding to the same session.

The second request message is used to request to activate the same session; or the second request message is used to request to activate the same session, the second request message carries deletion indication information, and the deletion indication information is used to indicate to delete (R)AN tunnel information of the same session; or the second request message is used to request to first deactivate the same session and then reactivate the same session.

According to a seventh aspect, a communication method is provided. The method is applied to a scenario in which a terminal device moves from a first AN node to a second AN node. The first AN node is managed by a first AMF node, and the second AN node is managed by a second AMF node. The method includes: receiving, by the first AMF node, a first request message from the second AMF node, where the first request message is used to request a mobility management context of the terminal device, and the first request message carries identification information of a to-be-activated session of the terminal device; sending, by the first AMF node, a first response message to the second AMF node, where the first response message carries the mobility management context of the terminal device; sending, by the first AMF node, a context release command to the first AN node when a signaling connection of the terminal device exists between the first AMF node and the first AN node, where the context release command is used to instruct to release a context of the terminal device; receiving, by the first AMF node, a context release complete message from the first AN node, where the context release complete message carries identification information of an active session of the terminal device; and when the to-be-activated session and the active session have a same session, skipping, by the first AMF node, sending a second request message to an SMF node corresponding to the same session, where the second request message is used to request to deactivate the same session. In the method, after receiving the first request message from the second AMF node, the first AMF node immediately replies with the response message corresponding to the first request message. In this way, the second AMF node requests to activate the session after receiving the response message, and after receiving the identification information of the active session, the first AMF node determines whether the active session and the to-be-activated session have the same session. The first AMF node does not request the SMF node to deactivate the same session. In this way, an activation failure problem caused in other approaches because it is requested to deactivate a session just after it is requested to activate the session is resolved, thereby improving a success rate of session activation.

With reference to the seventh aspect, in a first implementation of the seventh aspect, the method further includes: when the to-be-activated session and the active session have a different session, sending, by the first AMF node, a third request message to an SMF node corresponding to a session that is in the active session but not in the to-be-activated session, where the third request message is used to request to deactivate the session that is in the active session but not in the to-be-activated session.

According to an eighth aspect, a communication method is provided. The method includes: receiving, by an SMF node, a request message from an AMF node, where the request message is used to request to activate a session, the request message carries deletion indication information, and the deletion indication information is used to indicate to delete (radio) access network (R)AN tunnel information of the session; deleting, by the SMF node, the (R)AN tunnel information of the session according to the deletion indication information; sending, by the SMF node, a response message to the AMF node, where the response message carries core network tunnel information of the session. In the method, the (R)AN tunnel information is deleted. In this way, a data transmission failure caused because a UPF node sends data of a terminal device to a first AN node based on the information is avoided.

According to a ninth aspect, a communication method is provided. The method includes: receiving, by an SMF node, a request message from an AMF node, where the request message is used to request to first deactivate a session and then reactivate the session; deleting, by the SMF node, (radio) access network (R)AN tunnel information of the session based on the request message; and sending, by the SMF node, a response message to the AMF node, where the response message carries core network tunnel information of the session. In the method, the (R)AN tunnel information is deleted. In this way, a data transmission failure caused because a UPF node sends data of a terminal device to a first AN node based on the information is avoided.

According to a tenth aspect, a communication method is provided. The method includes: receiving, by an SMF node, a request message from an AMF node, where the request message is used to request to activate a session; and deleting, by the SMF node, (R)AN tunnel information of the session when the session is in an active state. In the method, the (R)AN tunnel information is deleted. In this way, a data transmission failure caused because a UPF node sends data of a terminal device to a first AN node based on the information is avoided.

According to an eleventh aspect, a communications apparatus is provided, including a unit or a means configured to perform the steps in the method in the first aspect. The communications apparatus may be an AMF node, or may be at least one processing element or chip.

According to a twelfth aspect, a communications apparatus is provided, including a unit or a means configured to perform the steps in the method in the second aspect or any implementation of the second aspect. The communications apparatus may be an AMF node, or may be at least one processing element or chip.

According to a thirteenth aspect, a communications apparatus is provided, including a unit or a means configured to perform the steps in the method in the third aspect or any implementation of the third aspect. The communications apparatus may be an AMF node, or may be at least one processing element or chip.

According to a fourteenth aspect, a communications apparatus is provided, including a unit or a means configured to perform the steps in the method in the fourth aspect or any implementation of the fourth aspect. The communications apparatus may be an AMF node, or may be at least one processing element or chip.

According to a fifteenth aspect, a communications apparatus is provided, including a unit or a means configured to perform the steps in the method in the fifth aspect or any implementation of the fifth aspect. The communications apparatus may be an AMF node, or may be at least one processing element or chip.

According to a sixteenth aspect, a communications apparatus is provided, including a unit or a means configured to perform the steps in the method in the sixth aspect or any implementation of the sixth aspect. The communications apparatus may be an AMF node, or may be at least one processing element or chip.

According to a seventeenth aspect, a communications apparatus is provided, including a unit or a means configured to perform the steps in the method in the seventh aspect or any implementation of the seventh aspect. The communications apparatus may be an AMF node, or may be at least one processing element or chip.

According to an eighteenth aspect, a communications apparatus is provided, including a unit or a means configured to perform the steps in the method in the eighth aspect or any implementation of the eighth aspect. The communications apparatus may be an SMF node, or may be at least one processing element or chip.

According to a nineteenth aspect, a communications apparatus is provided, including a unit or a means configured to perform the steps in the method in the ninth aspect or any implementation of the ninth aspect. The communications apparatus may be an SMF node, or may be at least one processing element or chip.

According to a twentieth aspect, a communications apparatus is provided, including a unit or a means configured to perform the steps in the method in the tenth aspect or any implementation of the tenth aspect. The communications apparatus may be an SMF node, or may be at least one processing element or chip.

According to a twenty-first aspect, a communications apparatus is provided, including a processor and a memory. The memory is configured to store a program, and the processor invokes the program stored in the memory, to perform the method in the first aspect or any implementation of the first aspect. The communications apparatus may be an AMF node, or may be at least one processing element or chip.

According to a twenty-second aspect, a communications apparatus is provided, including a processor and a memory.

The memory is configured to store a program, and the processor invokes the program stored in the memory, to perform the method in the second aspect or any implementation of the second aspect. The communications apparatus may be an AMF node, or may be at least one processing element or chip.

According to a twenty-third aspect, a communications apparatus is provided, including a processor and a memory. The memory is configured to store a program, and the processor invokes the program stored in the memory, to perform the method in the third aspect or any implementation of the third aspect. The communications apparatus may be an AMF node, or may be at least one processing element or chip.

According to a twenty-fourth aspect, a communications apparatus is provided, including a processor and a memory. The memory is configured to store a program, and the processor invokes the program stored in the memory, to perform the method in the fourth aspect or any implementation of the fourth aspect. The communications apparatus may be an AMF node, or may be at least one processing element or chip.

According to a twenty-fifth aspect, a communications apparatus is provided, including a processor and a memory. The memory is configured to store a program, and the processor invokes the program stored in the memory, to perform the method in the fifth aspect or any implementation of the fifth aspect. The communications apparatus may be an AMF node, or may be at least one processing element or chip.

According to a twenty-sixth aspect, a communications apparatus is provided, including a processor and a memory. The memory is configured to store a program, and the processor invokes the program stored in the memory, to perform the method in the sixth aspect or any implementation of the sixth aspect. The communications apparatus may be an AMF node, or may be at least one processing element or chip.

According to a twenty-seventh aspect, a communications apparatus is provided, including a processor and a memory. The memory is configured to store a program, and the processor invokes the program stored in the memory, to perform the method in the seventh aspect or any implementation of the seventh aspect. The communications apparatus may be an AMF node, or may be at least one processing element or chip.

According to a twenty-eighth aspect, a communications apparatus is provided, including a processor and a memory. The memory is configured to store a program, and the processor invokes the program stored in the memory, to perform the method in the eighth aspect or any implementation of the eighth aspect. The communications apparatus may be an SMF node, or may be at least one processing element or chip.

According to a twenty-ninth aspect, a communications apparatus is provided, including a processor and a memory. The memory is configured to store a program, and the processor invokes the program stored in the memory, to perform the method in the ninth aspect or any implementation of the ninth aspect. The communications apparatus may be an SMF node, or may be at least one processing element or chip.

According to a thirtieth aspect, a communications apparatus is provided, including a processor and a memory. The memory is configured to store a program, and the processor invokes the program stored in the memory, to perform the method in the tenth aspect or any implementation of the tenth aspect. The communications apparatus may be an SMF node, or may be at least one processing element or chip.

According to a thirty-first aspect, a program is provided, and the program is used to perform the method in any aspect of the first aspect to the tenth aspect when the program is executed by a processor.

According to a thirty-second aspect, a computer readable storage medium is provided, including the program in the thirty-first aspect.

DESCRIPTION OF EMBODIMENTS

The following describes the technical solutions in the embodiments of this application with reference to the accompanying drawings in the embodiments of this application.

The embodiments of this application may be applied to a 5G communications system, or may be applied to a subsequent evolved system.

Figure 1:
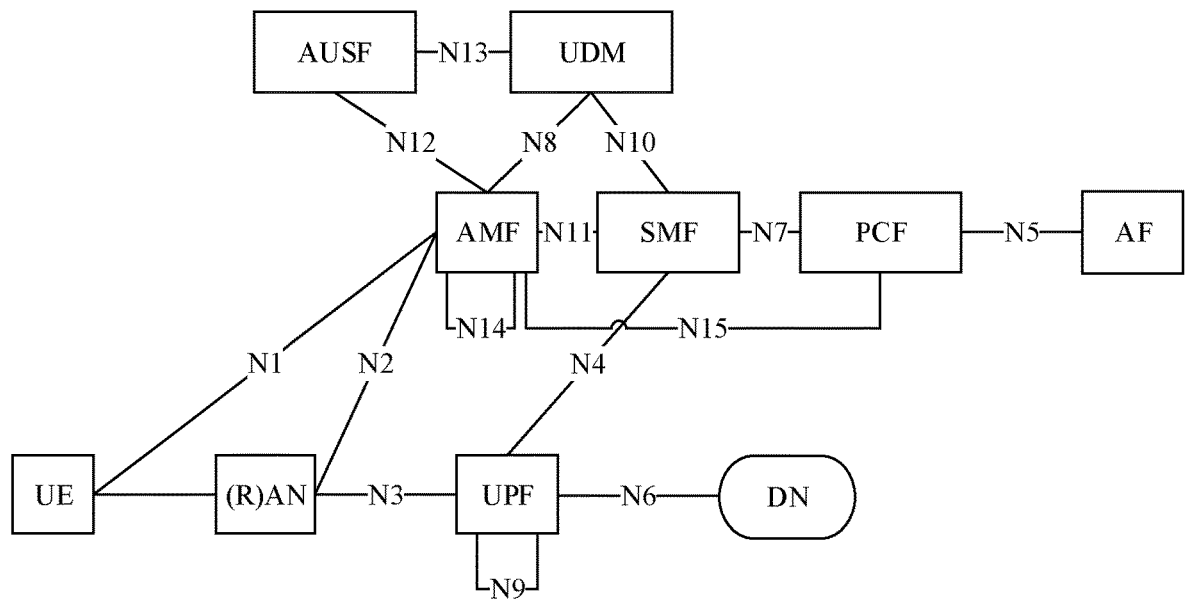
FIG. 1 is a schematic architectural diagram of a 5G communications system.

FIG. 1 is an architectural diagram of a 5G communications system. The 5G communications system mainly includes: an AMF node, an SMF node, a user plane function (UPF) node, a policy control function (PCF) node, a unified device management (UDM) node, an application function (AF) node, a data network (DN) node, an authentication server function (AUSF) node (R)AN) node, and a terminal device.

The (R)AN node implements a radio physical layer function, resource scheduling and radio resource management, and a radio access control and mobility management function. The (R)AN may be connected to the UPF node using a user plane interface N3, to transfer data of the terminal device. A control plane signaling connection may be further established between the (R)AN node and the AMF node using a control plane interface N2, to implement functions such as radio access bearer control.

The AMF node is mainly responsible for functions such as terminal device authentication, mobility management, network slice selection, and SMF node selection. As an anchor for an N1 signaling connection and an N2 signaling connection, the AMF node also routes an N1/N2 session management (SM) message to the SMF node, and maintains and manages status information of the terminal device.

The SMF node is mainly responsible for session management of the terminal device, including UPF node selection, Internet Protocol (IP) address assignment, quality of service (QoS) management of a session, obtaining a policy and charging control (PCC) policy from the PCF node, and the like.

The UPF node serves as an anchor of a PDU session connection. The UPF node is responsible for data packet filtering of user equipment, data transmission/forwarding, rate control, charging information generation, and the like.

The PCF node assigns a security policy to a network entity (for example, the AN node or the UPF node).

The UDM node stores subscription information of a user.

The DN provides an external data network service.

The AF node provides an application layer service.

The AUSF node is used for security authentication between the terminal device and a network side.

The terminal device may include various handheld devices, vehicle-mounted devices, wearable devices, or computing devices that have a wireless communication function or another processing device connected to a wireless modem; and terminals, mobile stations (MS), user equipment (UE), software terminals, and the like that are in various forms, such as a water meter, an electricity meter, or a sensor.

In this application, specific procedures of activating a session and deactivating a session may use a method in other approaches. This is not limited.

In this application, "a plurality of" means two or more, and "and/or" describes an association relationship between associated objects and represents that three relationships may exist. For example, A and/or B may represent the following three cases: Only A exists, both A and B exist, and only B exists. The character "/" generally indicates an "or" relationship between the associated objects.

In this application, a sequence of performing steps in each embodiment is not strictly limited, and may be exchanged or adjusted. Mutual reference may be made to the embodiments. Same or similar steps or nouns are not described one by one again.

In this application, related messages may be implemented in a service manner. In other words, the messages may be replaced with corresponding service messages. This is not limited. In addition, both the AMF node and the SMF node may be replaced with a device that has a same or similar function, and may be independent physical devices or may be function modules on a physical device. This is not limited.

It should be noted that the example mentioned in this application does not mean that the example is optimal. "First", "second", and the like mentioned in this application are merely used to distinguish between different information, messages, or other objects, and do not mean a sequence relationship.

The following case is found in a research process: When a terminal device moves from an AN node 1 to an AN node 2, a state of the terminal device on an AMF node is a connection management (CM)-CONNECTED (CM-Connected) state. It indicates that an N2 signaling connection is maintained between the AMF node and the AN node 1. The AMF node first receives non-access stratum (NAS) signaling request of the terminal device from the AN node 2, where the NAS signaling request carries an identifier of a to-be-activated packet data unit (PDU) session (PDU session ID(s) to be activated), for example, a registration request or a service request. The AMF node directly requests an SMF node to activate a session. Then, when the AMF node receives a list of active sessions of the terminal device from the AN node 1, for example, a list of session identifiers of PDU sessions with an active N3 interface user plane tunnel (List of PDU session ID(s) with active N3 user plane), the AMF node requests the SMF node to deactivate the session. When the PDU session ID(s) to be activated and the List of PDU session ID(s) with active N3 user plane are intersected or overlapped or partially the same, a session that the terminal device requests to activate is finally deactivated. In other words, the session activation fails.

For the foregoing found problem, this application provides the following embodiments, to resolve the foregoing problem.

Figure 2:
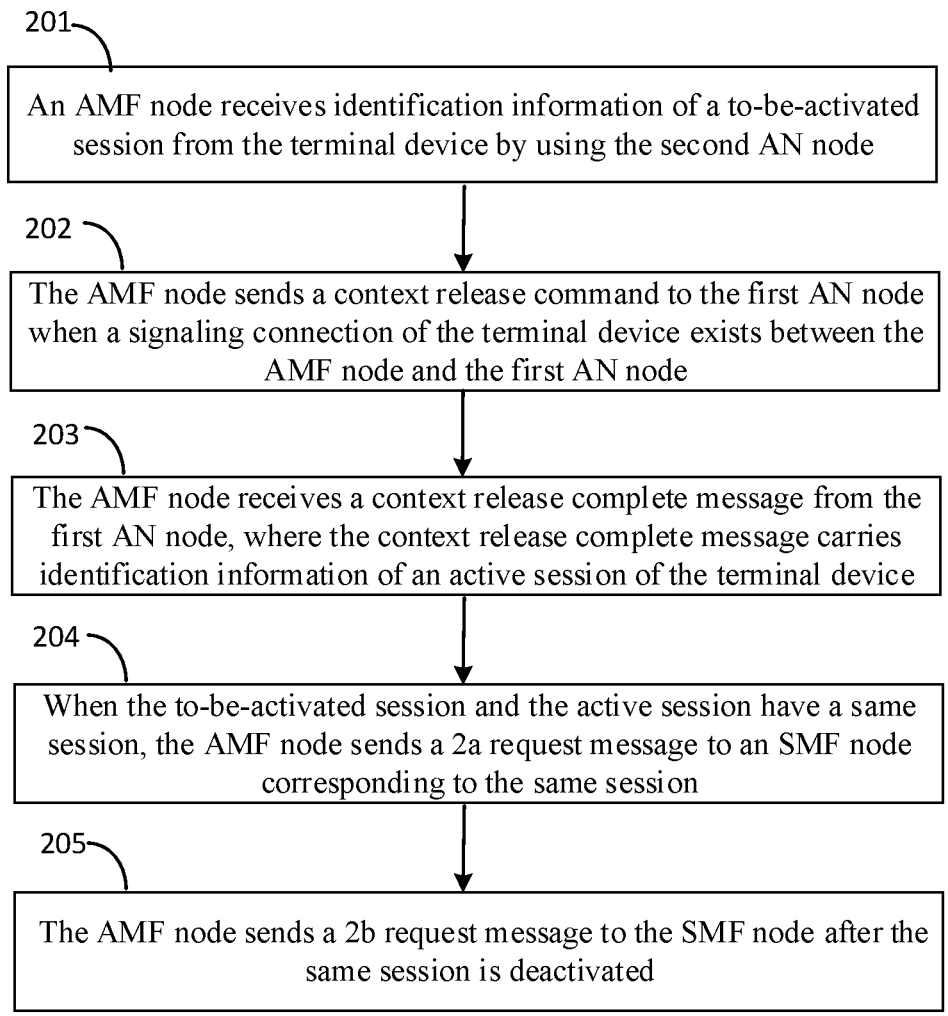
FIG. 2 is a schematic diagram of a communication method according to a first embodiment of this application.

As shown in FIG. 2, a first embodiment of this application provides a communication method. The method may be applied to a scenario in which a terminal device moves from a first AN node to a second AN node. The method is as follows.

201. An AMF node receives identification information of a to-be-activated session from the terminal device using the second AN node.

The identification information of the to-be-activated session may be used to identify the to-be-activated session. The identification information may be an identifier of the session, for example, a session ID; or may be a bit string. For example, each bit in the bit string may correspond to one session. A bit "1" may indicate that a session corresponding to the bit is a to-be-activated session. In other words, the session needs to be activated. For example, a bit string is "1001000000101101", and corresponds to sixteen sessions in total from a first session to a sixteenth session. The first session, a third session, a fourth session, a sixth session, a thirteenth session, and a sixteenth session need to be activated, in other words, are to-be-activated sessions. Each session may correspond to a session of different numbers. For example, when sessions are numbered from 1, the first session, the third session, the fourth session, the sixth session, the thirteenth session, and the sixteenth session may be respectively a session 1, a session 3, a session 4, a session 6, a session 13, and a session 16. When sessions are numbered from 0, the first session, the third session, the fourth session, the sixth session, the thirteenth session, and the sixteenth session may be respectively a session 0, a session 2, a session 3, a session 5, a session 12, and a session 15. Certainly, the identification information of the to-be-activated session may alternatively be indication information in another form.

The identification information of the to-be-activated session may be carried in a registration request message or a service request message. The registration request message or the service request message may carry identification information of one or more to-be-activated sessions. This is not limited.

For example, the terminal device may be in a radio resource control (RRC) inactive (RRC-inactive) state in a service range of the first AN node. After the terminal device moves to the second AN node, the terminal device initiates an RRC connection resume procedure. When the RRC connection resume fails (for example, because the second AN node does not support RRC-inactive state), the terminal device switches to a CM-IDLE state, and initiates a registration request procedure or a service request procedure. To be more specific, the terminal device sends a registration request message or a service request message to the second AN node. The registration request message or the service request message may carry the identification information of the to-be-activated session.

The to-be-activated session may be a session that the terminal device requests to activate. This is not limited.

202. The AMF node sends a context release command to the first AN node when a signaling connection of the terminal device exists between the AMF node and the first AN node.

The context release command is used to instruct to release a context of the terminal device, and the context release command may carry identification information of the terminal device.

The identification information of the terminal device may be a next-generation application protocol identifier assigned by the first AN node to the terminal device (AN UE NG-AP ID), or an N2 interface application protocol identifier assigned by the first AN node to the terminal device (AN UE N2-AP ID).

The signaling connection may be used to transmit signaling of the terminal device, for example, signaling sent by the AMF node to the terminal device or signaling sent by the terminal device to the AMF node. The signaling connection may be a non-access stratum (NAS) connection or an N2 connection. For example, when a CM state of the terminal device on the AMF node is a CM-CONNECTED state, the AMF node may determine that the signaling connection of the terminal device exists between the AMF node and the first AN node. Optionally, when the signaling connection of the terminal device exits between the AMF node and the first AN node, it also means that a NAS signaling connection of the terminal device exists between the AMF node and the terminal device.

203. The AMF node receives a context release complete message from the first AN node, where the context release complete message carries identification information of an active session of the terminal device.

The identification information of the active session is used to identify the active session, and may be an ID of the session or may be a bit string. For example, each bit in the bit string may correspond to one session. For example, a bit "1" may indicate that a session corresponding to the bit is in an active state. This is similar to the bit string of the to-be-activated session. Details are not described again. For example, the identification information of the active session may be a List of PDU session ID(s) with active N3 user plane.

The active session may be an active session of the terminal device on the first AN node. This is not limited.

It should be noted that there may be one or more to-be-activated sessions in step 201, and there may also be one or more active sessions in step 203. This is not limited.

204. When the to-be-activated session and the active session have a same session, the AMF node sends a 2a request message to an SMF node corresponding to the same session.

That the to-be-activated session and the active session have a same session may be as follows: The to-be-activated session and the active session are intersected or overlapped or have at least one same session. Correspondingly, the same session may be referred to as a session in an intersection set or a session in an overlapping area. This is not limited.

For example, when a quantity of to-be-activated sessions and a quantity of active sessions are both 1, that the to-be-activated session and the active session have a same session may be as follows: The to-be-activated session is the same as the active session.

For another example, when a quantity of to-be-activated sessions and a quantity of active sessions are both greater than 1, that the to-be-activated session and the active session have a same session may be as follows: The to-be-activated session and the active session are intersected or overlapped. There may be one or more sessions in an intersection set or an overlapping area. For example, if the quantity of to-be-activated sessions is 1, and the quantity of active sessions is greater than 1, the active sessions include the to-be-activated session. If the quantity of to-be-activated sessions is greater than 1, and the quantity of active sessions is 1, the to-be-activated sessions include the active session.

The 2a request message may be used to request to deactivate the same session, and may carry identification information of the same session. The identification information of the same session is used to identify the same session, and may be an identifier of the session or a bit string. For example, each bit in the bit string may correspond to one session, and a bit "1" may indicate that a session corresponding to the bit is a same session. For details, refer to the related descriptions of the identification information of the to-be-activated session. Details are not described again.

For example, the 2a request message may be an update session management context request message, for example, an Nsmf_PDUSession_updateSMContext Request message. The message may carry deactivation indication information. The deactivation indication information is used to indicate that the update session management context request message is used to request to deactivate a session.

It should be noted that a quantity of 2a request messages sent by the AMF node may be the same as a quantity of different SMF nodes corresponding to the same session.

In a first example, when the same session corresponds to a same SMF node. For example, when a quantity of same sessions is 1, there may be one 2a request message, and the 2a request message carries identification information of the same session.

In a second example, when the same sessions correspond to different SMF nodes, there may be a plurality of 2a request messages. In this case, that the AMF node sends a 2a request message to an SMF node corresponding to the same session in step 204 may be as follows: The AMF node sends a 2a request message to each of different SMF nodes corresponding to the same sessions. In this case, the 2a request message may carry identification information of some sessions in the same sessions.

For example, it is assumed that different SMF nodes corresponding to the same sessions include an SMF node 1 and an SMF node 2. In this case, that the AMF node sends a 2a request message to an SMF node corresponding to the same session in step 204 may be as follows: The AMF node sends a 2a request message to the SMF node 1, where the 2a request message is used to request to deactivate a session corresponding to the SMF node 1 in the same session; and the AMF node sends a 2a request message to the SMF node 2, where the 2a request message is used to request to deactivate a session corresponding to the SMF node 2 in the same session.

The SMF node corresponding to the same session may be an SMF node that provides a service for the same session. This is not limited.

205. The AMF node sends a 2b request message to the SMF node after the same session is deactivated.

The 2b request message may be used to request to activate the same session, and may carry the identification information of the same session. Refer to the foregoing related descriptions.

In addition, there may be one or more 2b request messages. This is similar to the 2a request message in step 204. Details are not described again.

For example, the 2b request message may be an update session management context request message, for example, an Nsmf_PDUSession_updateSMContext Request message. The message may carry activation indication information. The activation indication information is used to indicate that the update session management context request message is used to request to activate a session.

It should be noted that the activation indication information and the deactivation indication information may be different values set for a same indication bit. This is not limited.

For example, after receiving a response message corresponding to the 2a request message from the SMF node, the AMF node sends the 2b request message to the SMF node. For example, it is assumed that the 2a request message is an Nsmf_PDUSession_updateSMContext Request. In this case, when the AMF node receives the response message Nsmf_PDUSession_updateSMContext Response corresponding to the 2a request message, it may indicate that the same session has been deactivated.

In the method provided in the foregoing embodiment, after receiving the identification information of the to-be-activated session from the terminal device using the second AN node, the AMF node does not immediately send, to an SMF node, a message used to request to activate the session. Instead, the AMF node releases the signaling connection when the signaling connection of the terminal device exists between the AMF node and the first AN node. For example, the AMF node sends the context release command to the first AN node, and receives the identification information of the active session of the terminal device. When the active session and the to-be-activated session have the same session, the AMF node first requests to deactivate the same session and then requests to activate the same session. In this way, an activation failure problem caused in other approaches because it is requested to deactivate a session just after it is requested to activate the session is resolved, thereby improving a success rate of session activation and improving user experience.

Figure 3:
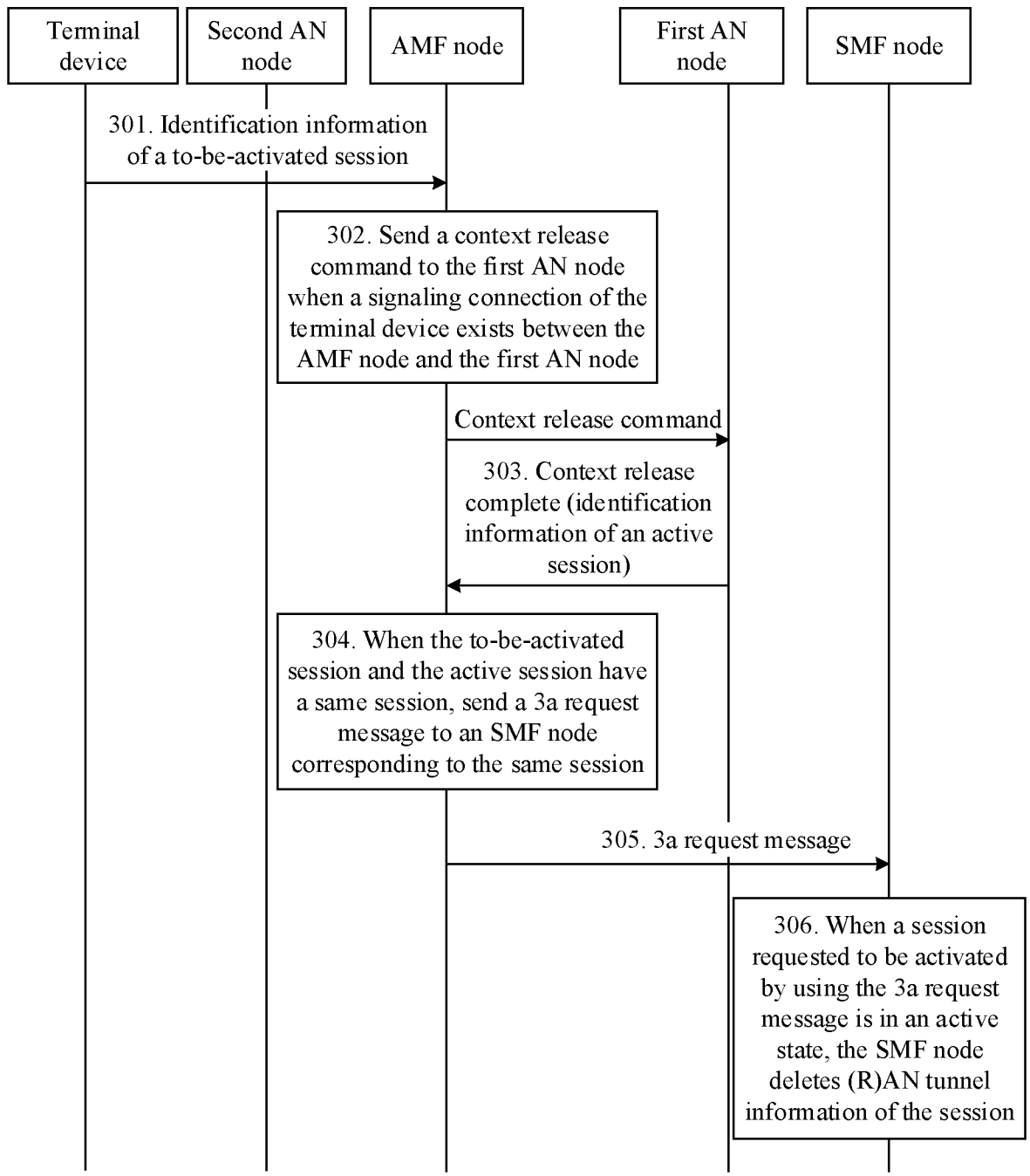
FIG. 3 is a schematic diagram of a communication method according to a second embodiment of this application.

As shown in FIG. 3, a second embodiment of this application provides a communication method. The method may be applied to a scenario in which a terminal device moves from a first AN node to a second AN node. The method is as follows.

301. An AMF node receives identification information of a to-be-activated session from the terminal device using the second AN node.

The identification information of the to-be-activated session may be carried in a registration request message or a service request message. The registration request message or the service request message may carry identification information of one or more to-be-activated sessions. This is not limited.

For example, the terminal device may be in an RRC-inactive state in a service range of the first AN node. After the terminal device moves to the second AN node, the terminal device initiates an RRC connection resume procedure. The terminal device switches to a CM-IDLE state, and initiates a registration request procedure or a service request procedure. To be more specific, the terminal device sends a registration request message or a service request message to the second AN node. The registration request message or the service request message may carry the identification information of the to-be-activated session.

302. The AMF node sends a context release command to the first AN node when a signaling connection of the terminal device exists between the AMF node and the first AN node.

The context release command may be used to instruct to release a context of the terminal device, and the context release command may carry identification information of the terminal device. For details, refer to the related descriptions of step 202. Details are not described again.

303. The AMF node receives a context release complete message from the first AN node.

The context release complete message carries identification information of an active session of the terminal device. The active session may be an active session of the terminal device on the first AN node. This is not limited.

304. When the to-be-activated session and the active session have a same session, the AMF node sends a 3a request message to an SMF node corresponding to the same session.

The 3a request message may be used to request to activate the same session, and may carry identification information of the same session. Refer to the related descriptions of the 2b request message in the embodiment shown in FIG. 2. Details are not described again.

305. The SMF node receives the 3a request message.

306. When the session requested to be activated using the 3a request message is in an active state, the SMF node deletes (R)AN tunnel information ((R)AN tunnel info) of the session.

For example, after receiving the 3a request message, and before activating the session based on the 3a request message, the SMF node determines whether the session is in the active state. If the session is in the active state, for example, the SMF node stores a state of the session, and the state that is corresponding to the session and that is stored in the SMF node is the active state (for example, a session context that is of the session and that is maintained by the SMF node includes the (R)AN tunnel information), the SMF node deletes the (R)AN tunnel information of the session. If the session is in a deactivated state (for example, the session context that is of the session and that is maintained by the SMF node does not include the (R)AN tunnel information), the SMF node activates the session.

It is assumed that the SMF node receives the 3a request message to request to activate sessions 1 and 2, a state of the session 1 on the SMF node is the active state, and a state of the session 2 on the SMF node is the deactivated state. In this case, the SMF node deletes (R)AN tunnel information of the session 1, and activates the session 2.

It should be noted that there may be one or more sessions requested to be activated using the 3a request message. However, the session requested to be activated using the 3a request message in step 306 may be some sessions in all sessions requested to be activated using the 3a request message, for example, an active session on the SMF node. This is not limited.

Optionally, after step 306, the method further includes: The SMF node sends a 3a response message to the AMF node, where the 3a response message carries core network tunnel information of the session.

For example, the 3a request message may be an update session management context request message, for example, an Nsmf_PDUSession_updateSMContext Request message. The message may carry activation indication information. The activation indication information is used to indicate that the update session management context request message is used to request to activate a session. The 3a response message may be an Nsmf_PDUSession_updateSMContext Response.

The core network tunnel information may include N3 interface tunnel identifier information assigned by the SMF node or a UPF node to a session of the terminal device. Optionally, when an N3 interface uses a General Packet Radio Service (GPRS) tunneling protocol-user plane (GTP)-User Plane (GTP-U) protocol, the core network tunnel information is N3 interface GTP-U tunneling protocol identifier information assigned by the SMF node or the UPF node to the session of the terminal device.

The (R)AN tunnel information may include N3 interface tunnel identifier information assigned by the AN node to the session of the terminal device. Optionally, when the N3 interface uses the GTP-U protocol, the (R)AN tunnel information is N3 interface GTP-U tunneling protocol identifier information assigned by the AN node to the session of the terminal device.

Optionally, the foregoing method further includes: When the to-be-activated session and the active session have a different session, the AMF node sends a 3b request message to an SMF node corresponding to the to-be-activated session, and sends a 3c request message to an SMF node corresponding to the active session.

The 3b request message may be used to request to activate a session that is in the to-be-activated session but not in the active session. In other words, the 3b request message is used to request to activate a session in the to-be-activated session except an intersection set or an overlapping area between the to-be-activated session and the active session. For example, if the intersection set or the overlapping area does not exist between the to-be-activated session and the active session, the 3b request message may be used to request to activate the to-be-activated session. For example, the 3b request message may be an update session management context request message, for example, an Nsmf_PDUSession_updateSMContext Request message. The message may carry activation indication information. The activation indication information is used to indicate that the update session management context request message is used to request to activate a session.

For example, the 3b request message may carry identification information of the session that is in the to-be-activated session but not in the active session. The identification information may be an identifier of the session or a bit string. For example, each bit in the bit string may correspond to one session, and a bit "1" may indicate that a session corresponding to the bit is a session requested to be activated. Refer to the foregoing related descriptions. Details are not described again.

The 3c request message is used to request to deactivate a session that is in the active session but not in the to-be-activated session. In other words, the 3c request message is used to request to deactivate a session in the active session except the intersection set or the overlapping area between the to-be-activated session and the active session. For example, if the intersection set or the overlapping area does not exist between the to-be-activated session and the active session, the 3c request message may be used to request to deactivate the active session. For example, the 3c request message may be an update session management context request message, for example, an Nsmf_PDUSession_updateSMContext Request message. The message may carry deactivation indication information. The deactivation indication information is used to indicate that the update session management context request message is used to request to deactivate a session.

For example, the 3c request message may carry identification information of the session that is in the active session but not in the to-be-activated session. The identification information may be an identifier of the session or a bit string. For example, each bit in the bit string may correspond to one session, and a bit "1" may indicate that a session corresponding to the bit is a session requested to be deactivated. Refer to the foregoing related descriptions. Details are not described again.

It should be noted that the activation indication information and the deactivation indication information may be different values set for a same indication bit. This is not limited.

It should be noted that there may be one or more 3b request messages, and a quantity of 3b request messages may be the same as a quantity of SMF nodes corresponding to sessions requested to be activated; and similarly, there may also be one or more 3c request messages, and a quantity of 3c request messages may be the same as a quantity of SMF nodes corresponding to sessions requested to be deactivated.

For example, it is assumed that to-be-activated sessions include sessions 1, 2, 3, and 4, active sessions include sessions 2, 4, 5, and 6, the sessions 1, 2, and 3 correspond to an SMF node 1, the sessions 4 and 5 correspond to an SMF node 2, and the session 6 corresponds to an SMF node 3. In this case, the 3b request message is used to request to activate the sessions 1 and 3, and the 3b request message may include only one message and be sent to the SMF node 1. The 3c request message may include two messages. A 3c request message 1 sent to the SMF node 2 is used to request to deactivate the session 5, and a 3c request message 2 sent to the SMF node 3 is used to request to deactivate the session 6.

Based on the foregoing embodiment, this application further provides an alternative method. The 3a request message carries deletion indication information. The deletion indication information is used to indicate to delete (R)AN tunnel information of the session requested to be activated using the 3a request message. Step 306 may be replaced with the following: The SMF node deletes, according to the deletion indication information, the (R)AN tunnel information of the session requested to be activated using the 3a request message, and sends a response message to the AMF node, where the response message carries the core network tunnel information of the session.

For the core network tunnel information, refer to the foregoing related descriptions. Details are not described again.

Based on the foregoing embodiment, this application further provides another alternative method. The 3a request message is used to request to first deactivate a session and then reactivate the session. Step 306 may be replaced with the following: The SMF node deletes (R)AN tunnel information of the session based on the 3a request message, and sends a response message to the AMF node, where the response message carries the core network tunnel information of the session.

It should be noted that in steps 301 and 302, the AMF node does not immediately initiate a session activation procedure (in other words, delays initiation of the session activation procedure) when receiving a registration request message or a service request message (carrying the identification information of the to-be-activated session); and instead, the AMF node determines whether the signaling connection of the terminal device exists between the AMF node and the first AN node, and may instruct the first AN node to release the context of the terminal device if the signaling connection exists or may initiate the session activation procedure if the signaling connection does not exit.

In the method provided in the foregoing embodiment, after receiving the identification information of the to-be-activated session from the terminal device using the second AN node, the AMF node does not immediately send, to the SMF node, a message used to request to activate the session. Instead, the AMF node releases the signaling connection of the terminal device when the signaling connection of the terminal device exists between the AMF node and the first AN node. For example, the AMF node sends the context release command to the first AN node, and receives the identification information of the activated session of the terminal device. When the active session and the to-be-activated session have the same session, the AMF node first requests to deactivate the same session and then requests to activate the same session, or the AMF node requests to activate the same session. In this way, an activation failure problem caused in other approaches because it is requested to deactivate a session just after it is requested to activate the session is resolved, thereby improving a success rate of session activation and improving user experience.

Figure 4:
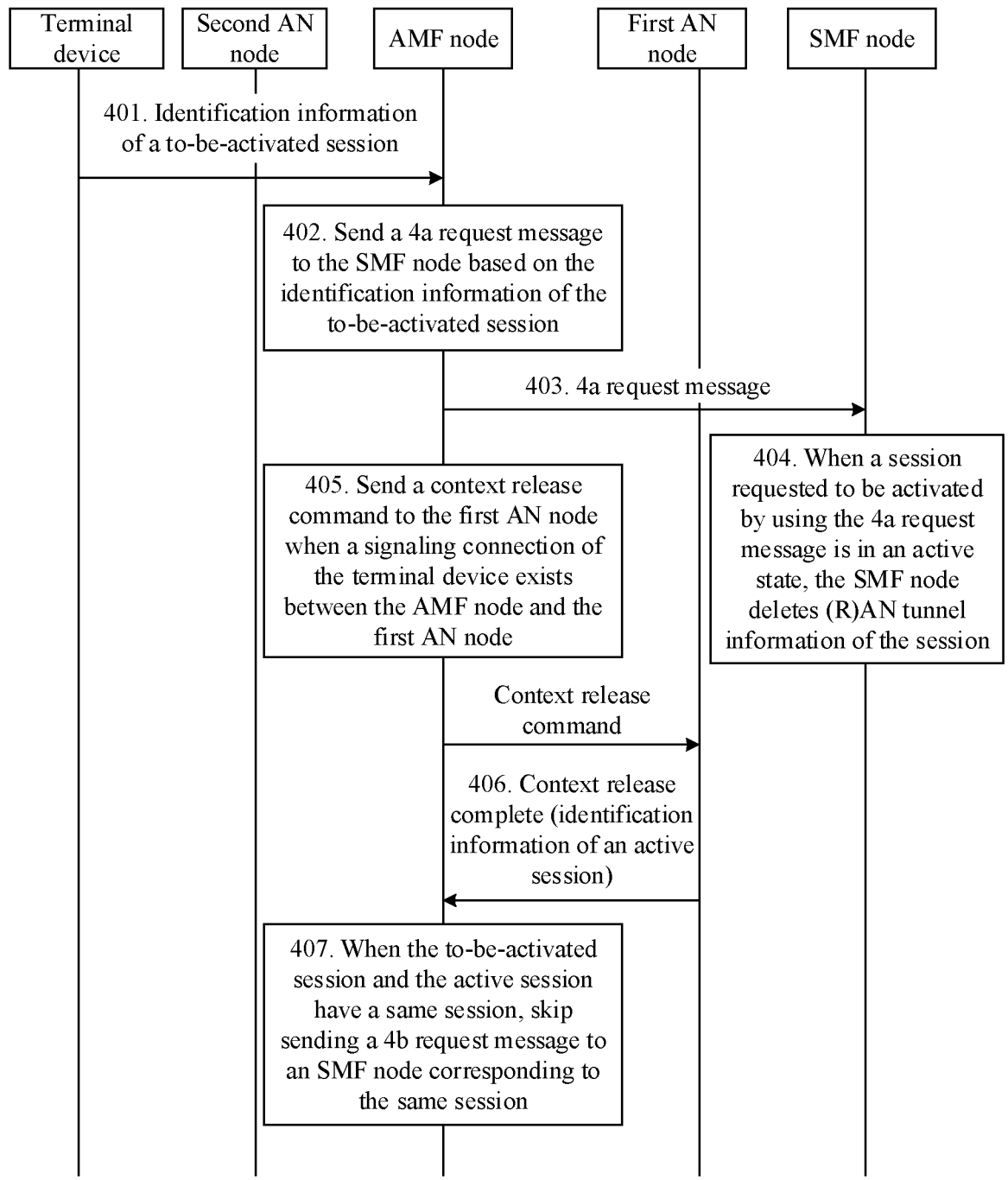
FIG. 4 is a schematic diagram of a communication method according to a third embodiment of this application.

As shown in FIG. 4, a third embodiment of this application provides a communication method. The method is applied to a scenario in which a terminal device moves from a first AN node to a second AN node. The terminal device may be in an inactive state. The method is as follows.

401. An AMF node receives identification information of a to-be-activated session from the terminal device using the second AN node.

The identification information of the to-be-activated session may be carried in a registration request message or a service request message. The registration request message or the service request message may carry identification information of one or more to-be-activated sessions. This is not limited.

For example, the terminal device may be in an RRC-inactive state in a service range of the first AN node. After the terminal device moves to the second AN node, the terminal device initiates an RRC connection resume procedure. The terminal device switches to a CM-IDLE state, and initiates a registration request procedure or a service request procedure. To be more specific, the terminal device sends a registration request message or a service request message to the second AN node. The registration request message or the service request message may carry the identification information of the to-be-activated session.

402. The AMF node sends a 4a request message to an SMF node based on the identification information of the to-be-activated session.

The 4a request message is used to request to activate the to-be-activated session, and may carry the identification information of the to-be-activated session. The identification information is used to identify the to-be-activated session. Refer to the related descriptions in the embodiment shown in FIG. 2. Details are not described again. For example, the 4a request message may be an update session management context request message, for example, an Nsmf_PDUSession_updateSMContext Request message. The message may carry activation indication information. The activation indication information is used to indicate that the update session management context request message is used to request to activate a session.

The SMF node may be an SMF node corresponding to the to-be-activated session. In addition, there may be one or more 4a request messages. For example, a quantity of 4a request messages may be the same as a quantity of SMF nodes corresponding to the to-be-activated session. This is not limited. For example, to-be-activated sessions include sessions 1, 2, 3, and 4, the sessions 1 and 2 correspond to an SMF node 1, and the sessions 3 and 4 correspond to an SMF node 2. The 4a request message may include two messages. One message is sent to the SMF node 1, and the message carries identification information of the sessions 1 and 2; and the other message is sent to the SMF node 2, and the message carries identification information of the sessions 3 and 4.

403. The SMF node receives the 4a request message.

404. When the session requested to be activated using the 4a request message is in an active state, the SMF node deletes (R)AN tunnel information ((R)AN tunnel info) of the session.

For step 404, refer to the related descriptions of step 306. This is not limited.

Optionally, after step 404, the method further includes: The SMF node sends core network tunnel information of the session to the AMF node. The core network tunnel information may be carried in a response message corresponding to the 4a request message.

For example, the 4a request message may be an update session management context request message, for example, an Nsmf_PDUSession_updateSMContext Request message. The message may carry activation indication information. The activation indication information is used to indicate that the update session management context request message is used to request to activate a session. The response message corresponding to the 4a request message may be an Nsmf_P-DUSession_updateSMContext Response.

405. The AMF node sends a context release command to the first AN node when a signaling connection of the terminal device exists between the AMF node and the first AN node.

The context release command is used to instruct to release a context of the terminal device.

406. The AMF node receives a context release complete message from the first AN node.

The context release complete message carries identification information of an active session of the terminal device. The active session may be an active session of the terminal device on the first AN node. This is not limited.

407. When the to-be-activated session and the active session have a same session, the AMF node skips sending a 4b request message to an SMF node corresponding to the same session.

The 4b request message is used to request to deactivate the same session. For the 4b request message, refer to the related descriptions of the 2a request message. Details are not described again.

It should be noted that a sequence of performing steps 403 and 404 and a sequence of performing steps 405 to 407 may be exchanged, or steps 403 and 404 and steps 405 to 407 may be simultaneously performed. This is not limited.

Optionally, the method further includes: When the to-be-activated session and the active session have a different session, the AMF node sends, to an SMF node corresponding to the active session, a request message used to request to deactivate a session that is in the active session but not in the to-be-activated session. For details, refer to the related descriptions of the 3c request message. Details are not described again.

In the method provided in the foregoing embodiment, after receiving the identification information of the to-be-activated session from the terminal device using the second AN node, the AMF node immediately requests the SMF node to activate the session. The AMF node releases the signaling connection when the signaling connection of the terminal device exists between the AMF node and the first AN node. For example, the AMF node sends the context release command to the first AN node, and receives the identification information of the active session of the terminal device. When the active session and the to-be-activated session have the same session, the AMF node no longer requests to deactivate the same session. In this way, an activation failure problem caused in other approaches because it is requested to deactivate a session just after it is requested to activate the session is resolved, thereby improving a success rate of session activation and improving user experience.

Figure 5:
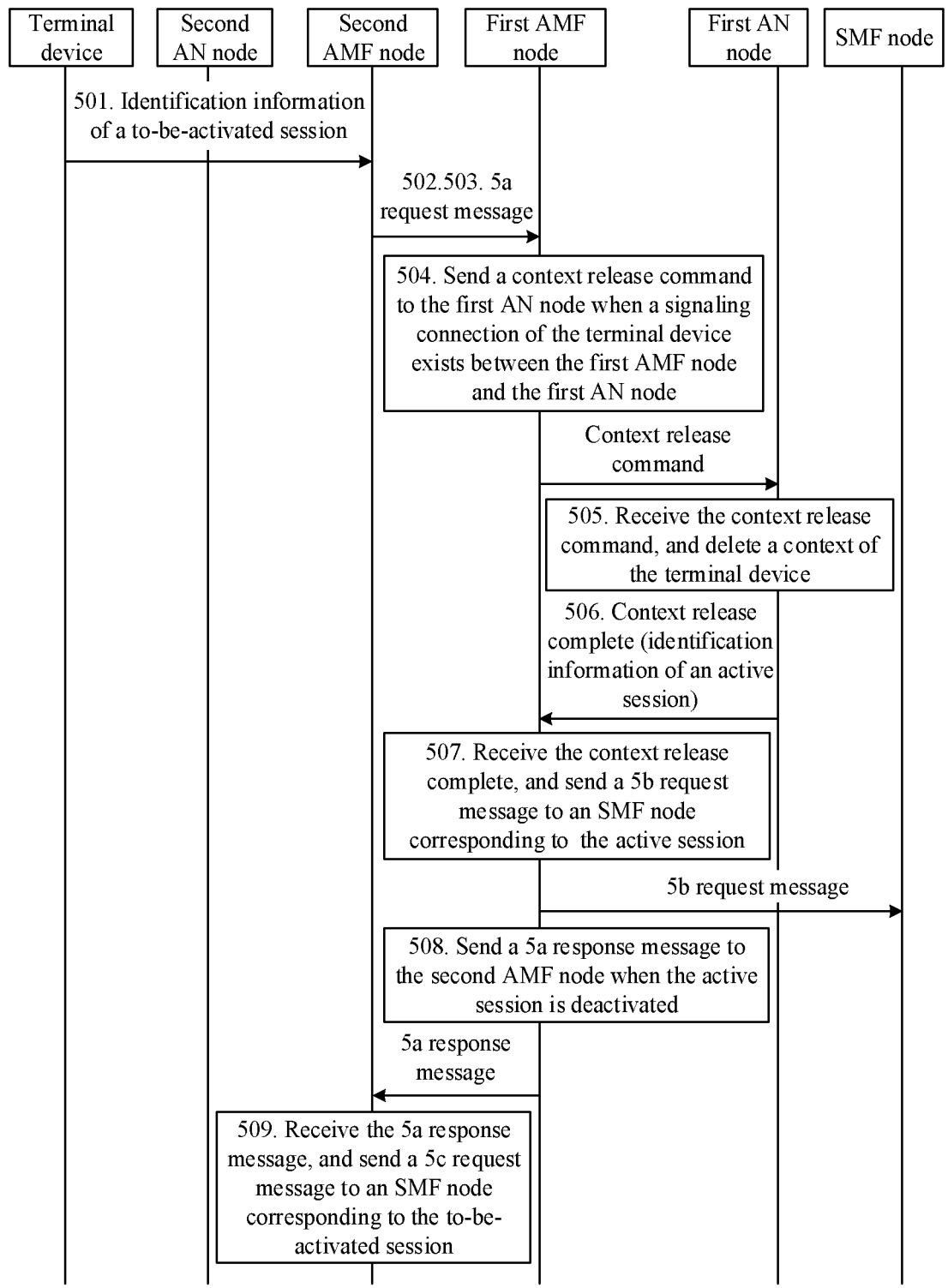
FIG. 5 is a schematic diagram of a communication method according to a fourth embodiment of this application.

As shown in FIG. 5, a fourth embodiment of this application provides a communication method. The communication method is applied to a scenario in which a terminal device moves from a first AN node to a second AN node. The first AN node is managed by a first AMF node, and the second AN node is managed by a second AMF node. The method is as follows.

501. The second AMF node receives identification information of a to-be-activated session from the terminal device using the second AN node.

The identification information of the to-be-activated session may be carried in a registration request message or a service request message. The registration request message or the service request message may carry identification information of one or more to-be-activated sessions. This is not limited.

For example, the terminal device may be in an RRC-inactive state in a service range of the first AN node. After the terminal device moves to the second AN node, the terminal device initiates an RRC connection resume procedure. The terminal device switches to a CM-IDLE state, and initiates a registration request procedure or a service request procedure. To be more specific, the terminal device sends a registration request message or a service request message to the second AN node. The registration request message or the service request message may carry the identification information of the to-be-activated session.

502. The second AMF node sends a 5a request message to the first AMF node.

The 5a request message may be used to request a context of the terminal device, and the 5a request message may be a context transfer request, for example, a Namf_Communication_UEContextTransfer Request. For example, the 5a request message may carry identification information of the terminal device, for example, 5G-globally unique temporary identity (GUTI) (5G-GUTI).

The context may be a mobility management (MM) context.

For example, the registration request message or the service request message in step 501 may carry the 5G-GUTI, and the second AMF node may obtain an address of the first AMF node based on the 5G-GUTI and send the 5a request message to the first AMF node.

503. The first AMF node receives the 5a request message from the second AMF node.

504. The first AMF node sends a context release command to the first AN node when a signaling connection of the terminal device exists between the first AMF node and the first AN node.

The context release command is used to instruct to release a context of the terminal device.

505. The first AN node receives the context release command, and deletes the context of the terminal device.

For example, before deleting the context of the terminal device, the first AN node may determine whether an (R)AN connection exists between the first AN node and the terminal device. If the (R)AN connection exists, the first AN node releases the (R)AN connection. For example, the first AN node sends the RRC connection release message to the terminal device.

The (R)AN connection may include an RRC connection or an NWu connection, where NWu is a logical interface between the terminal device and a non-3GPP interworking function (N3IWF).

506. The first AN node sends a context release complete message to the first AMF node.

The context release complete message carries identification information of an active session of the terminal device. The active session may be an active session of the terminal device on the first AN node. This is not limited.

507. The first AMF node receives the context release complete message, and sends a 5b request message to an SMF node corresponding to the active session.

The 5b request message is used to request to deactivate the active session, and may carry the identification information of the active session. The identification information is used to identify the active session. Refer to the related descriptions in the embodiment shown in FIG. 2. For example, the 5b request message may be an update session management context request message, for example, an Nsmf_PDUSession_updateSMContext Request message. The message may carry deactivation indication information. The deactivation indication information is used to indicate that the update session management context request message is used to request to deactivate a session.

There may be one or more 5b request messages. For example, a quantity of 5b request messages may be the same as a quantity of SMF nodes corresponding to the active session. This is not limited. For example, active sessions include sessions 1, 2, 3, and 4, the sessions 1 and 2 correspond to an SMF node 1, and the sessions 3 and 4 correspond to an SMF node 2. The 5b request message may include two messages. One message is sent to the SMF node 1, and the message carries identification information of the sessions 1 and 2; and the other message is sent to the SMF node 2, and the message carries identification information of the sessions 3 and 4.

508. The first AMF node sends a 5a response message to the second AMF node after the active session is deactivated.

The 5a response message may be used to respond to the 5a request message, and the 5a response message carries an MM context of the terminal device. For example, a Namf_Communication_UEContextTransfer Response carries the MM context of the terminal device.

For example, after receiving a response message corresponding to the 5b request message from the SMF node, the first AMF node sends the 5a response message to the second AMF node. For example, it is assumed that the 5b request message is an Nsmf_PDUSession_updateSMContext Request. In this case, when the first AMF node receives the response message Nsmf_PDUSession_updateSMContext Response corresponding to the 5b request message, it may indicate that the same session has been deactivated.

509. The second AMF node receives the 5a response message, and sends a 5c request message to an SMF node corresponding to the to-be-activated session.

The 5c request message is used to request to activate the to-be-activated session, and may carry the identification information of the to-be-activated session. For details, refer to the related descriptions of the 4a request message. Details are not described again.

It should be noted that reference may be made to the related descriptions in the foregoing embodiments for steps and nouns in this embodiment. Details are not described again.

According to the method provided in the foregoing embodiment, in the method, the first AMF node receives, from the second AMF node, a message used to request the context of the terminal device. The first AMF node releases the signaling connection when the signaling connection of the terminal device exists between the first AMF node and the first AN node. For example, after sending the context release command to the first AN node and receiving the identification information of the active session of the terminal device, the first AMF node requests the SMF node to deactivate the active session, and sends the context of the terminal device to the second AMF node after the deactivation succeeds, such that the corresponding session has been successfully deactivated when the second AMF node receives the context of the terminal device and then requests to activate the session. In this way, an activation failure problem caused in other approaches because it is requested to deactivate a session just after it is requested to activate the session is resolved, thereby improving a success rate of session activation and improving user experience.

Figure 6:
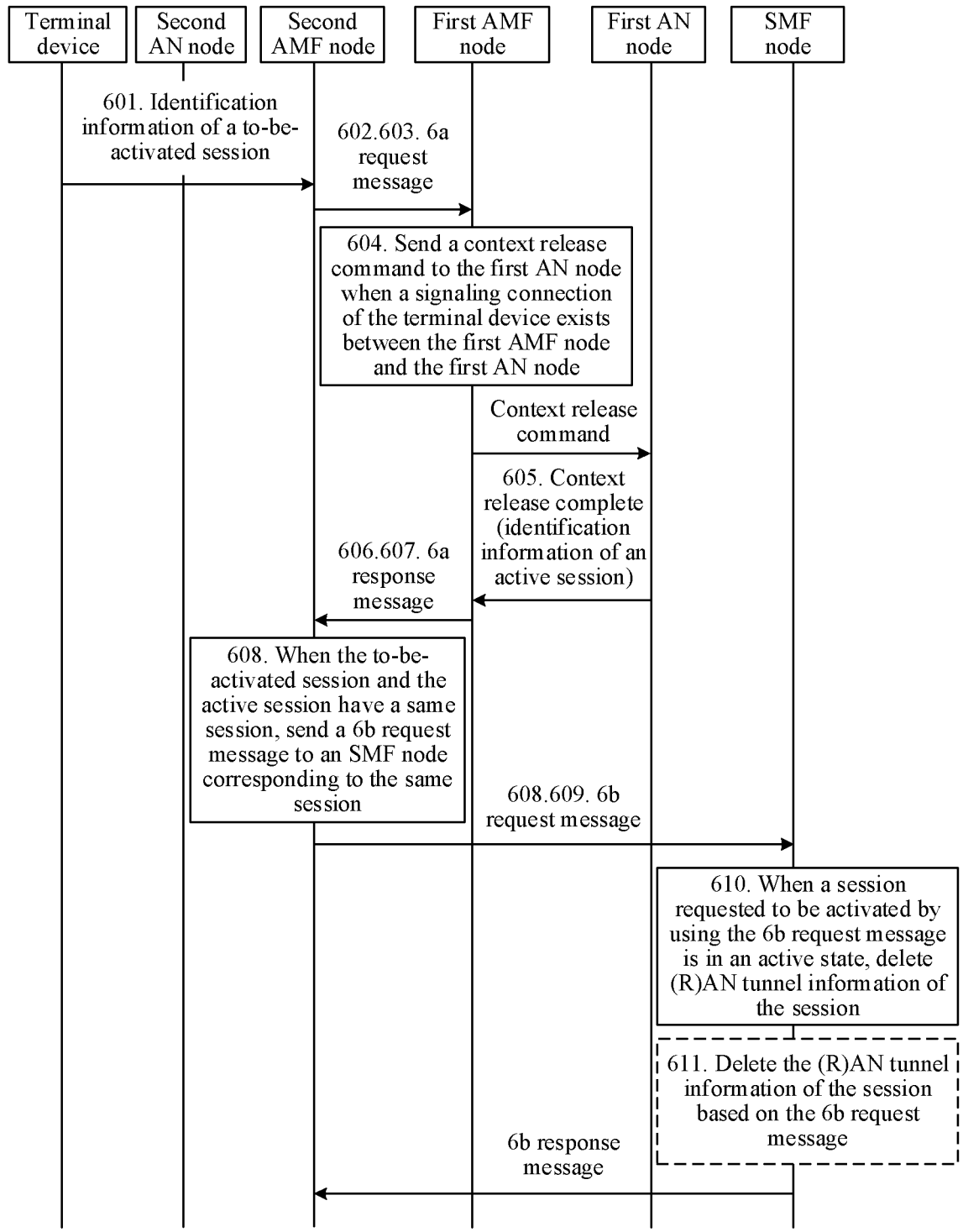
FIG. 6 is a schematic diagram of a communication method according to a fifth embodiment of this application.

As shown in FIG. 6, a fifth embodiment of this application provides a communication method. The communication method is applied to a scenario in which a terminal device moves from a first AN node to a second AN node. The first AN node is managed by a first AMF node, and the second AN node is managed by a second AMF node. The method is as follows.

601. The second AMF node receives identification information of a to-be-activated session from the terminal device using the second AN node.

The identification information of the to-be-activated session may be carried in a registration request message or a service request message.

For example, the terminal device may be in an RRC-inactive state in a service range of the first AN node. After the terminal device moves to the second AN node, the terminal device initiates an RRC connection resume procedure. The terminal device switches to a CM-IDLE state, and initiates a registration request procedure or a service request procedure. To be more specific, the terminal device sends a registration request message or a service request message to the second AN node. The registration request message or the service request message may carry the identification information of the to-be-activated session.

602. The second AMF node sends a 6a request message to the first AMF node.

The 6a request message is used to request a mobility management context of the terminal device. The 6a request message may carry the identification information of the to-be-activated session of the terminal device, and may further carry identification information of the terminal device. Refer to the foregoing related descriptions.

The to-be-activated session may be used by the first AMF node to deactivate a session that is in an active session of the terminal device but not in the to-be-activated session.

603. The first AMF node receives the 6a request message from the second AMF node.

604. The first AMF node sends a context release command to the first AN node when a signaling connection of the terminal device exists between the first AMF node and the first AN node.

The context release command is used to instruct to release a context of the terminal device, and may carry the identification information of the terminal device. Refer to the foregoing related descriptions.

605. The first AMF node receives a context release complete message from the first AN node.

The context release complete message carries identification information of the active session of the terminal device. The active session may be an active session of the terminal device on the first AN node. This is not limited.

606. The first AMF node sends a 6a response message to the second AMF node.

The 6a response message may be used to respond to the 6a request message, and may carry the mobility management context of the terminal device.

In an example, when the to-be-activated session and the active session have a same session, the 6a response message may further carry identification information of the same session. Alternatively, when the to-be-activated session and the active session do not have a same session, the 6a response message may further carry indication information indicating that the same session does not exit. The indication information is used to indicate that the to-be-activated session and the active session do not have the same session.

In another example, the 6a response message may further carry the identification information of the active session.

607. The second AMF node receives the 6a response message from the first AMF node.

Steps 608 and 609 are optional steps. For example, when the 6a response message further carries the identification information of the active session of the terminal device, step 608 is performed. When the 6a response message further carries the identification information of the same session, step 609 is performed. When the 6a response message further carries the indication information indicating that the same session does not exist, steps 608 and 609 may not be performed. In other words, all subsequent steps are no longer performed. Instead, the second AMF node sends, to an SMF node corresponding to the to-be-activated session, a request message used to request to activate the to-be-activated session. The request message may be an update session management context request message. For details, refer to the related descriptions in the embodiment shown in FIG. 5. Details are not described again.

608. When the to-be-activated session and the active session have the same session, the second AMF node sends a 6b request message to an SMF node corresponding to the same session.

The 6b request message may have the following three cases described as follows.

Case 1: The 6b request message is used to request to activate the same session. For example, the 6b request message may be an update session management context request message, for example, an Nsmf_PDUSession_updateSMContext Request message. The message may carry activation indication information. The activation indication information is used to indicate that the update session management context request message is used to request to activate a session.

Case 2: The 6b request message is used to request to activate the same session, and the 6b request message carries deletion indication information. The deletion indication information is used to indicate to delete (R)AN tunnel information of the same session. For example, the 6b request message may be an update session management context request message, for example, an Nsmf_PDUSession_updateSMContext Request message. The message may carry activation indication information. The activation indication information is used to indicate that the update session management context request message is used to request to activate a session. The deletion indication information may be directed to all or some sessions requested to be activated using the 6b request message. This is not limited.

Case 3: The 6b request message is used to request to first deactivate the same session and then reactivate the same session. For example, the 6b request message may be an update session management context request message, for example, an Nsmf_PDUSession_updateSMContext Request message. The message may carry activation/deactivation indication information. The activation/deactivation indication information is used to indicate that the update session management context request message is used to request to deactivate a session and then reactivate the session.

609. The second AMF node sends the 6b request message to the SMF node corresponding to the same session.

The 6b request message may have the foregoing three cases. Details are not described herein again.

Steps 610 and 611 are optional steps. For example, in Case 1, steps 610 and 612 are performed. In Case 2 or Case 3, steps 611 and 612 are performed.

610. The SMF node receives the 6b request message, and when the session requested to be activated using the 6b request message is in an active state, the SMF node deletes (R)AN tunnel information of the session.

For step 610, refer to the related descriptions of step 306. Details are not described again.

611. The SMF node receives the 6b request message, and deletes the (R)AN tunnel information of the session based on the 6b request message.

For example, in Case 2, deleting the (R)AN tunnel information of the session based on the 6b request message may be deleting the (R)AN tunnel information of the session according to the deletion indication information. In addition, when the deletion indication information is directed to some sessions of the 6b request message, step 611 is deleting (R)AN tunnel information of these sessions.

For example, in Case 3, step 611 may be deleting (R)AN tunnel information of all sessions that are requested to be activated using the 6b request message.

612. The SMF node sends a 6b response message to the second AMF node.

The 6b response message may be used to respond to the 6b request message, and may carry core network tunnel information of the session.

For example, the 6b response message may be an Nsmf_PDUSession_updateSMContext Response.

Optionally, the foregoing method further includes the following:

When the to-be-activated session and the active session have a different session, the first AMF node sends a 6c request message to an SMF node corresponding to a session that is in the active session but not in the to-be-activated session. The 6c request message is used to request to deactivate the session that is in the active session but not in the to-be-activated session. For details, refer to the related descriptions of the 3c request message. Details are not described again.

It should be noted that reference may be made to the related descriptions in the foregoing embodiments for steps and nouns in this embodiment. Details are not described again.

According to the method provided in this embodiment, the second AMF node provides the identification information of the to-be-activated session to the first AMF node, and the first AMF node does not request the SMF node to deactivate the to-be-activated session. In this way, an activation failure problem caused in other approaches because it is requested to deactivate a session just after it is requested to activate the session is resolved, thereby improving a success rate of session activation. In addition, in the method, the second AMF node requests the SMF node to delete the (R)AN tunnel information of the same session. In this way, a data transmission failure caused because a UPF node sends data of the terminal device to the first AN node based on the information is avoided.

Figure 7:
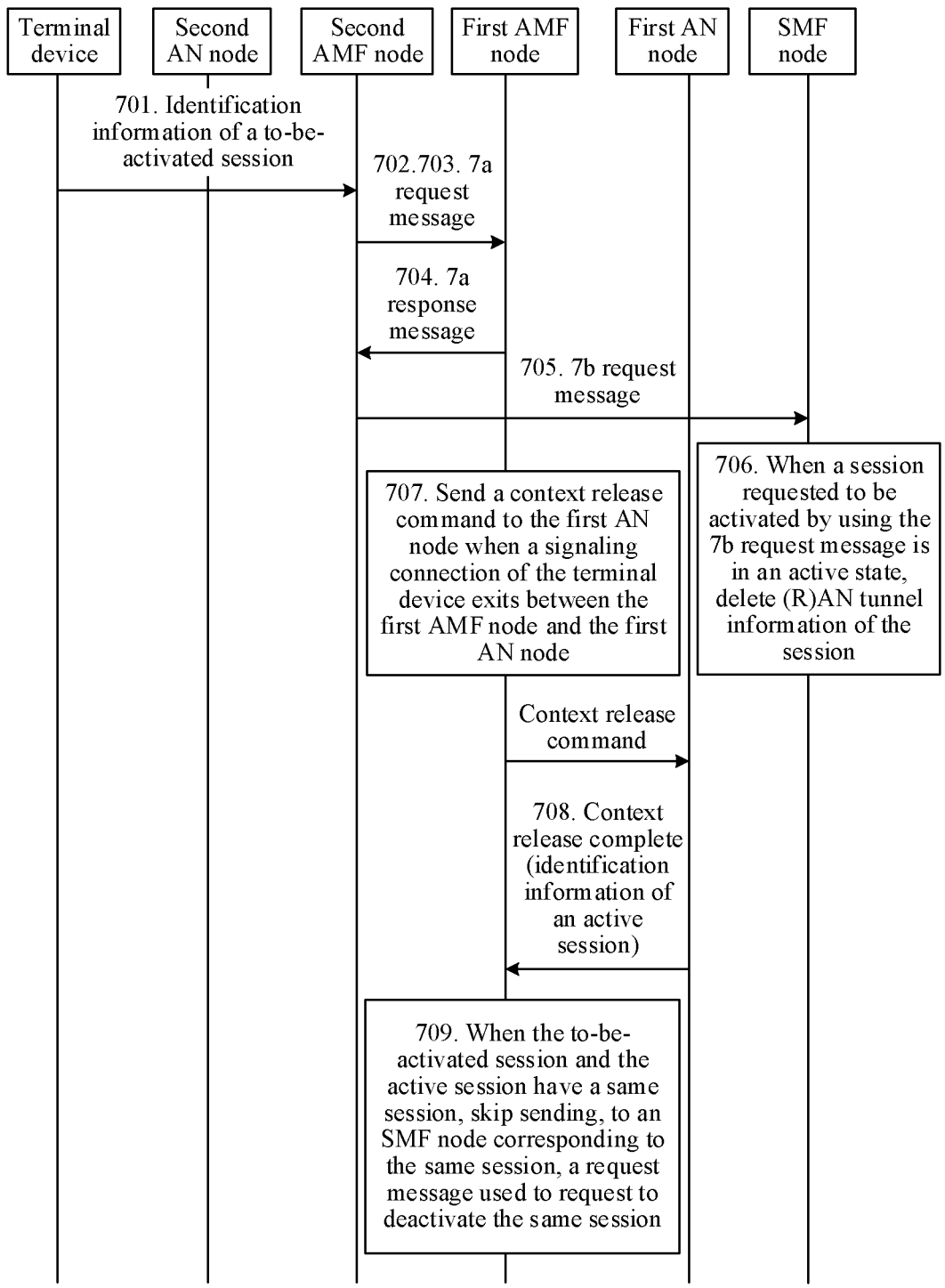
FIG. 7 is a schematic diagram of a communication method according to a sixth embodiment of this application.

As shown in FIG. 7, a sixth embodiment of this application provides a communication method. The communication method is applied to a scenario in which a terminal device moves from a first AN node to a second AN node. The first AN node is managed by a first AMF node, and the second AN node is managed by a second AMF node. The method is as follows.

701. The second AMF node receives identification information of a to-be-activated session from the terminal device using the second AN node.

The identification information of the to-be-activated session may be carried in a registration request message or a service request message. For example, the terminal device may be in an RRC-inactive state in a service range of the first AN node. After the terminal device moves to the second AN node, the terminal device initiates an RRC connection resume procedure. The terminal device switches to a CM-IDLE state, and initiates a registration request procedure or a service request procedure. To be more specific, the terminal device sends a registration request message or a service request message to the second AN node. The registration request message or the service request message may carry the identification information of the to-be-activated session.

702. The second AMF node sends a 7a request message to the first AMF node.

The 7a request message is used to request a context of the terminal device, for example, an MM context. The 7a request message may carry the identification information of the to-be-activated session of the terminal device, and may further carry identification information of the terminal device. Refer to the foregoing related descriptions.

The 7a request message may be a context transfer request, for example, a Namf_Communication_UEContextTransfer Request.

703. The first AMF node receives the 7a request message.
704. The first AMF node sends a 7a response message to the second AMF node.

The 7a response message may be used to respond to the 7a request message, and may carry the MM context of the terminal device. For example, a Namf_Communication_UEContextTransfer Response carries the MM context of the terminal device.

705. After receiving the 7a response message, the second AMF node sends a 7b request message to an SMF node corresponding to the to-be-activated session.

The 7b request message is used to request to activate the to-be-activated session. For details, refer to the related descriptions of the 4a request message. Details are not described again.

706. The SMF node receives the 7b request message, and when the session requested to be activated using the 7b request message is in an active state, deletes (R)AN tunnel information of the session.

For step 706, refer to the related descriptions of step 306. This is not limited.

Optionally, after step 706, the method further includes: The SMF node sends core network tunnel information of the session to the AMF node. The core network tunnel information may be carried in a response message corresponding to the 7b request message.

For example, the 7b request message may be an update session management context request message, for example, an Nsmf_PDUSession_updateSMContext Request message. The message may carry activation indication information. The activation indication information is used to indicate that the update session management context request message is used to request to activate a session. The response message corresponding to the 7b request message may be an Nsmf_PDUSession_updateSMContext Response.

707. The first AMF node sends a context release command to the first AN node when a signaling connection of the terminal device exists between the first AMF node and the first AN node.

The context release command is used to instruct to release a context of the terminal device, and may carry the identification information of the terminal device.

708. The first AMF node receives a context release complete message.

The context release complete message carries identification information of an active session of the terminal device. The active session may be an active session of the terminal device on the first AN node. This is not limited.

709. When the to-be-activated session and the active session have a same session, the first AMF node skips sending, to an SMF node corresponding to the same session, a request message used to request to deactivate the same session.

It should be noted that a sequence of performing steps 705 and 706 and a sequence of performing steps 707 and 708 may be exchanged, or steps 705 and 706 and steps 707 and 708 may be simultaneously performed. This is not limited.

It should be noted that reference may be made to the related descriptions in the foregoing embodiments for steps and nouns in this embodiment. Details are not described again.

Optionally, the foregoing method further includes the following.

When the to-be-activated session and the active session have a different session, the first AMF node sends a 7c request message to an SMF node corresponding to a session that is in the active session but not in the to-be-activated session. The 7c request message is used to request to deactivate the session that is in the active session but not in the to-be-activated session. For details, refer to the related descriptions of the 3c request message. Details are not described again.

According to the method provided in this embodiment, after receiving the first request message from the second AMF node, the first AMF node immediately replies with the response message corresponding to the first request message. In this way, the second AMF node requests to activate the session after receiving the response message, and after receiving the identification information of the active session, the first AMF node determines whether the active session and the to-be-activated session have the same session. The first AMF node does not request the SMF node to deactivate the same session. In this way, an activation failure problem caused in other approaches because it is requested to deactivate a session just after it is requested to activate the session is resolved, thereby improving a success rate of session activation.

Figure 8:
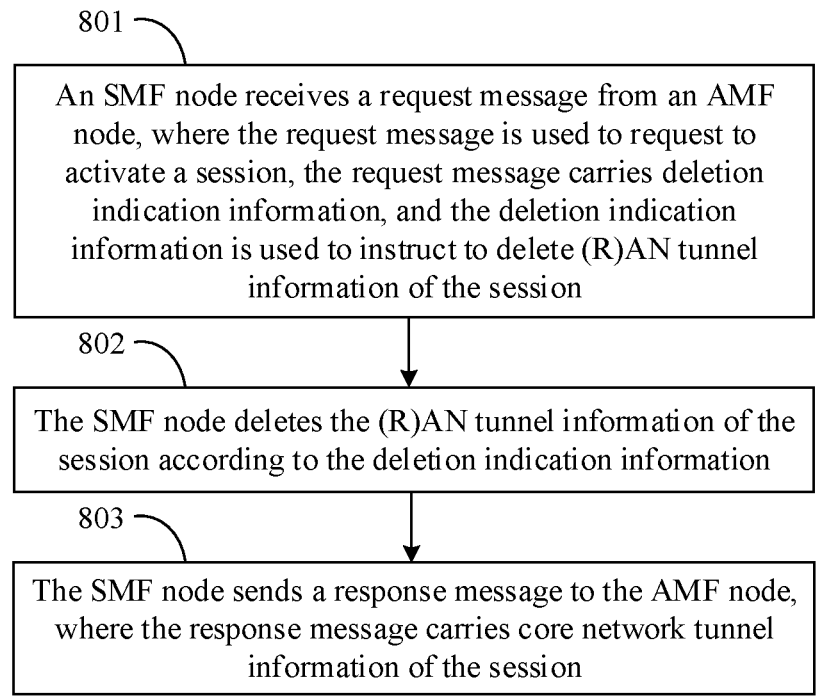
FIG. 8 is a schematic diagram of a communication method according to a seventh embodiment of this application.

As shown in FIG. 8, a seventh embodiment of this application provides a communication method. The method is described as follows.

801. An SMF node receives a request message from an AMF node.

The request message is used to request to activate a session, and the request message carries deletion indication information. The deletion indication information is used to indicate to delete (R)AN tunnel information of the session.

In addition, the request message may carry identification information of the session. The identification information is used to identify the session. Refer to the related descriptions in the foregoing embodiments. Details are not described again.

802. The SMF node deletes the (R)AN tunnel information of the session according to the deletion indication information.

For example, when the deletion indication information is directed to some sessions of the request message, step 802 is deleting (R)AN tunnel information of these sessions. Details are not described again.

803. The SMF node sends a response message to the AMF node, where the response message carries core network tunnel information of the session.

Step 803 is an optional step.

For example, the request message may be an update session management context request message, for example, an Nsmf_PDUSession_updateSMContext Request message. The message may carry activation indication information. The activation indication information is used to indicate that the update session management context request message is used to request to activate a session. The response message may be an Nsmf_PDUSession_updateSMContext Response.

According to the method provided in the foregoing embodiment, the SMF node receives the request message from the AMF node. The request message is used to request to activate the session. The request message carries the deletion indication information. The deletion indication information is used to indicate to delete the (R)AN tunnel information of the session. The SMF node deletes the (R)AN tunnel information of the session according to the deletion indication information. In this way, the (R)AN tunnel information is deleted, and a data transmission failure caused because a UPF node sends data of a terminal device to a first AN node based on the information is avoided.

Figure 9:
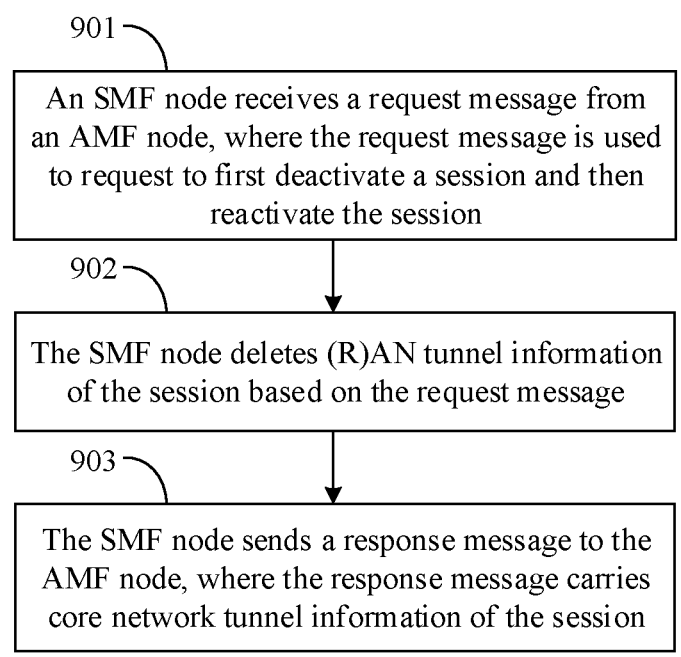
FIG. 9 is a schematic diagram of a communication method according to an eighth embodiment of this application.

As shown in FIG. 9, an eighth embodiment of this application provides a communication method. The method is described as follows.

901. An SMF node receives a request message from an AMF node, where the request message is used to request to first deactivate a session and then reactivate the session.

The request message may carry identification information of the session. The identification information is used to identify the session. Refer to the related descriptions in the foregoing embodiments. Details are not described again.

902. The SMF node deletes (R)AN tunnel information of the session based on the request message.

903. The SMF node sends a response message to the AMF node, where the response message carries core network tunnel information of the session.

Step 903 is an optional step.

For example, the request message may be an update session management context request message, for example, an Nsmf_PDUSession_updateSMContext Request message. The message may carry activation/deactivation indication information. The activation/deactivation indication information is used to indicate that the update session management context request message is used to request to deactivate a session and then reactivate the session. The response message may be an Nsmf_PDUSession_updateSMContext Response.

According to the method provided in the foregoing embodiment, the SMF node receives the request message from the AMF node. The request message is used to request to first deactivate the session and then reactivate the session. The SMF node deletes the (R)AN tunnel information of the session based on the request message. In this way, the (R)AN tunnel information is deleted, and a data transmission failure caused because a UPF node sends data of a terminal device to a first AN node based on the information is avoided.

Figure 10:
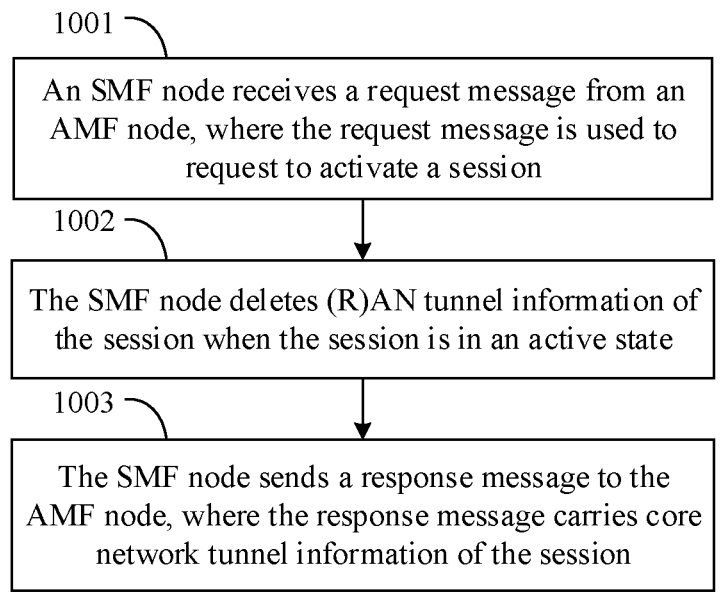
FIG. 10 is a schematic structural diagram of a communications apparatus according to a ninth embodiment of this application.

As shown in FIG. 10, a ninth embodiment of this application provides a communication method. The method is described as follows.

1001. An SMF node receives a request message from an AMF node, where the request message is used to request to activate a session.

The request message may carry identification information of the session. The identification information is used to identify the session. For details, refer to the related descriptions in the foregoing embodiments. Details are not described again.

1002. The SMF node deletes (R)AN tunnel information of the session when the session is in an active state.

For example, after receiving the request message and before activating the session based on the request message, the SMF node determines whether the session is in the active state. If the session is in the active state, for example, the SMF node stores a state of the session and the state that is corresponding to the session and that is stored in the SMF node is the active state (for example, a session context that is of the session and that is maintained by the SMF node has the (R)AN tunnel information), the SMF node deletes the (R)AN tunnel information of the session. If the session is in a deactivated state (for example, the session context that is of the session and that is maintained by the SMF node does not have the (R)AN tunnel information), the SMF node activates the session.

Optionally, after step 1002, the method further includes the following step.

1003. The SMF node sends a response message to the AMF node, where the response message carries core network tunnel information of the session.

For example, the request message may be an update session management context request message, for example, an Nsmf_PDUSession_updateSMContext Request message. The message may carry activation indication information. The activation/deactivation indication information is used to indicate that the update session management context request message is used to request to activate a session. The response message may be an Nsmf_PDUSession_updateSMContext Response.

According to the method provided in the foregoing embodiment, the SMF node receives the request message from the AMF node. The SMF node deletes the (R)AN tunnel information of the session when the session is in the active state. In this way, the (R)AN tunnel information is deleted, and a data transmission failure caused because a UPF node sends data of a terminal device to a first AN node based on the information is avoided.

Figure 11:
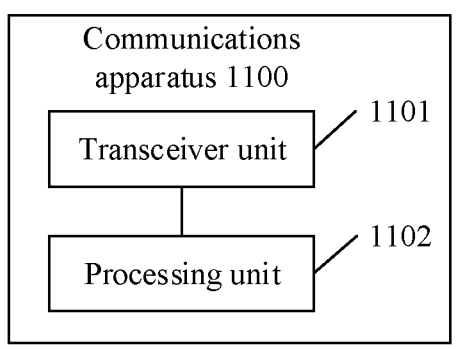
FIG. 11 is a schematic structural diagram of a communications apparatus according to a tenth embodiment of this application.

As shown in FIG. 11, a tenth embodiment of this application provides a communications apparatus 1100. The apparatus 1100 may be applied to a scenario in which a terminal device moves from a first AN node to a second AN node. The apparatus 1100 may be an AMF node or be inside the AMF node (for example, a chip or a system-on-a-chip). The apparatus 1100 may be configured to perform an action of the AMF node in the method embodiment shown in FIG. 2. The apparatus 1100 includes a transceiver unit 1101 and a processing unit 1102.

The transceiver unit 1101 is configured to receive identification information of a to-be-activated session from the terminal device using the second AN node.

The processing unit 1102 is configured to send a context release command to the first AN node when a signaling connection of the terminal device exists between the AMF node and the first AN node. The context release command is used to instruct to release a context of the terminal device.

The transceiver unit 1101 is further configured to receive a context release complete message from the first AN node. The context release complete message carries identification information of an active session of the terminal device.

The processing unit 1102 is further configured to: when the to-be-activated session and the active session have a same session, send, using the transceiver unit 1101, a first request message to an SMF node corresponding to the same session. The first request message is used to request to deactivate the same session.

The processing unit 1102 is further configured to send a second request message to the SMF node using the transceiver unit 1101 after the same session is deactivated. The second request message is used to request to activate the same session.

Optionally, the identification information of the to-be-activated session is carried in a registration request message or a service request message.

Figure 12:
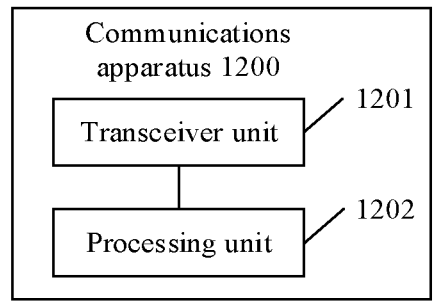
FIG. 12 is a schematic structural diagram of a communications apparatus according to an eleventh embodiment of this application.

As shown in FIG. 12, an eleventh embodiment of this application provides a communications apparatus 1200. The apparatus 1200 may be applied to a scenario in which a terminal device moves from a first AN node to a second AN node. The apparatus 1200 may be an AMF node or be inside the AMF node (for example, a chip or a system-on-a-chip). The apparatus 1200 may be configured to perform an action of the AMF node in the method embodiment shown in FIG. 3. The apparatus 1200 includes a transceiver unit 1201 and a processing unit 1202.

The transceiver unit 1201 is configured to receive identification information of a to-be-activated session from the terminal device using the second AN node.

The processing unit 1202 is configured to send a context release command to the first AN node when a signaling connection of the terminal device exists between the AMF node and the first AN node. The context release command is used to instruct to release a context of the terminal device.

The transceiver unit 1201 is further configured to receive a context release complete message from the first AN node. The context release complete message carries identification information of an active session of the terminal device.

The processing unit 1202 is further configured to: when the to-be-activated session and the active session have a same session, send, using the transceiver unit 1201, a first request message to an SMF node corresponding to the same session. The first request message is used to request to activate the same session, or the first request message is used to request to deactivate the same session and then reactivate the same session.

Optionally, the processing unit 1202 is further configured to: when the to-be-activated session and the active session have a different session, send a second request message to an SMF node corresponding to a session that is in the to-be-activated session but not in the active session, and send a third request message to an SMF node corresponding to a session that is in the active session but not in the to-be-activated session.

The second request message is used to request to activate the session that is in the to-be-activated session but not in the active session, and the third request message is used to request to deactivate the session that is in the active session but not in the to-be-activated session.

Optionally, when the first request message is used to request to activate the same session, the first request message carries deletion indication information, and the deletion indication information is used to request to delete (R)AN tunnel information of the same session.

Figure 13:
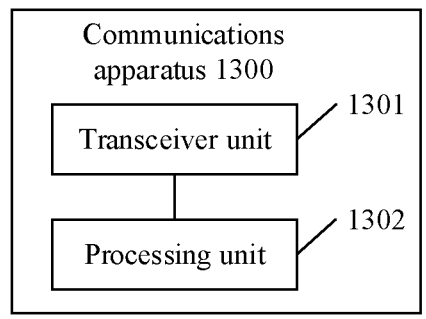
FIG. 13 is a schematic structural diagram of a communications apparatus according to a twelfth embodiment of this application.

As shown in FIG. 13, a twelfth embodiment of this application provides a communications apparatus 1300. The apparatus 1300 may be applied to a scenario in which a terminal device moves from a first AN node to a second AN node. The apparatus 1300 may be an AMF node or be inside the AMF node (for example, a chip or a system-on-a-chip). The apparatus 1300 may be configured to perform an action of the AMF node in the method embodiment shown in FIG. 4. The apparatus 1300 includes a transceiver unit 1301 and a processing unit 1302.

The transceiver unit 1301 is configured to receive identification information of a to-be-activated session from the terminal device using the second AN node.

The processing unit 1302 is configured to send a first request message to an SMF node based on the identification information of the to-be-activated session using the transceiver unit 1301. The first request message is used to request to activate the to-be-activated session.

The processing unit 1302 is further configured to send a context release command to the first AN node using the transceiver unit 1301 when a signaling connection of the terminal device exists between the AMF node and the first AN node. The context release command is used to instruct to release a context of the terminal device.

The transceiver unit 1301 is further configured to receive a context release complete message from the first AN node. The context release complete message carries identification information of an active session of the terminal device.

The processing unit 1302 is further configured to: when the to-be-activated session and the active session have a same session, skip sending a second request message to an SMF node corresponding to the same session. The second request message is used to request to deactivate the same session.

Figure 14:
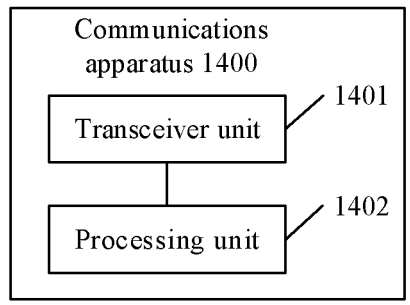
FIG. 14 is a schematic structural diagram of a communications apparatus according to a thirteenth embodiment of this application.

As shown in FIG. 14, a thirteenth embodiment of this application provides a communications apparatus 1400. The communications apparatus 1400 may be applied to a scenario in which a terminal device moves from a first AN node to a second AN node. The first AN node is managed by a first AMF node, and the second AN node is managed by a second AMF node. The apparatus 1400 may be the first AMF node or be inside the first AMF node. For example, the apparatus 1400 may be configured to perform an action of the first AMF node in the embodiment shown in FIG. 5. The apparatus 1400 includes a transceiver unit 1401 and a processing unit 1402.

The transceiver unit 1401 is configured to receive a first request message from the second AMF node. The first request message is used to request an MM context of the terminal device.

The processing unit 1402 is configured to send a context release command to the first AN node using the transceiver unit 1401 when a signaling connection of the terminal device exists between the first AMF node and the first AN node. The context release command is used to instruct to release a context of the terminal device.

The transceiver unit 1401 is further configured to receive a context release complete message from the first AN node. The context release complete message carries identification information of an active session of the terminal device.

The transceiver unit 1401 is further configured to send a second request message to an SMF node corresponding to the active session. The second request message is used to request to deactivate the active session.

The processing unit 1402 is further configured to send a first response message to the second AMF node using the transceiver unit 1401 after the active session is deactivated. The first response message carries the MM context of the terminal device.

Figure 15:
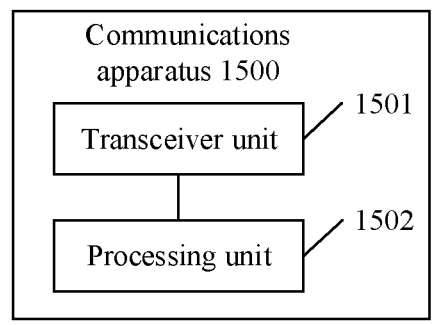
FIG. 15 is a schematic structural diagram of a communications apparatus according to a fourteenth embodiment of this application.

As shown in FIG. 15, a fourteenth embodiment of this application provides a communications apparatus 1500. The communications apparatus 1500 may be applied to a scenario in which a terminal device moves from a first AN node to a second AN node. The first AN node is managed by a first AMF node, and the second AN node is managed by a second AMF node. The apparatus 1500 may be the first AMF node or be inside the first AMF node. For example, the apparatus 1500 may be configured to perform an action of the first AMF node in the embodiment shown in FIG. 6. The apparatus 1500 includes a transceiver unit 1501 and a processing unit 1502.

The transceiver unit 1501 is configured to receive a first request message from the second AMF node. The first request message is used to request a mobility management context of the terminal device, and the first request message carries identification information of a to-be-activated session of the terminal device.

The processing unit 1502 is configured to send a context release command to the first AN node using the transceiver unit 1501 when a signaling connection of the terminal device exists between the first AMF node and the first AN node. The context release command is used to instruct to release a context of the terminal device.

The transceiver unit 1501 is further configured to receive a context release complete message from the first AN node. The context release complete message carries identification information of an active session of the terminal device.

The transceiver unit 1501 is further configured to send a first response message to the second AMF node. The first response message carries the mobility management context of the terminal device.

Optionally, when the to-be-activated session and the active session have a same session, the first response message further carries identification information of the same session; or when the to-be-activated session and the active session do not have a same session, the first response message further carries indication information, and the indication information is used to indicate that the to-be-activated session and the active session do not have the same session.

Optionally, the first response message further carries identification information of the active session.

Optionally, the processing unit 1502 is further configured to: when the to-be-activated session and the active session have a different session, send, using the transceiver unit 1501, a second request message to an SMF node corresponding to a session that is in the active session but not in the to-be-activated session, where the second request message is used to request to deactivate the session that is in the active session but not in the to-be-activated session.

Figure 16:
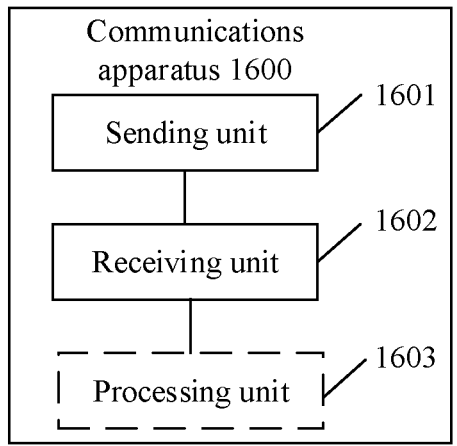
FIG. 16 is a schematic structural diagram of a communications apparatus according to a fifteenth embodiment of this application.

As shown in FIG. 16, a fifteenth embodiment of this application provides a communications apparatus 1600. The communications apparatus 1600 is applied to a scenario in which a terminal device moves from a first AN node to a second AN node. The first AN node is managed by a first AMF node, and the second AN node is managed by a second AMF node. The apparatus 1600 may be the second AMF node or be inside the second AMF node. For example, the apparatus 1600 may be configured to perform an action of the second AMF node in the embodiment shown in FIG. 6. The apparatus 1600 may include a sending unit 1601 and a receiving unit 1602.

The sending unit 1601 is configured to send a first request message to the first AMF node. The first request message is used to request a mobility management context of the terminal device, and the first request message carries identification information of a to-be-activated session of the terminal device.

The receiving unit 1602 is configured to receive a first response message from the first AMF node. The first response message carries the mobility management context of the terminal device.

Optionally, the first response message further carries identification information of an active session of the terminal device, and the apparatus 1600 further includes: a processing unit 1603, configured to: when the to-be-activated session and the active session have a same session, send, using the sending unit 1601, a second request message to an SMF node corresponding to the same session.

The second request message is used to request to activate the same session; or the second request message is used to request to activate the same session, the second request message carries deletion indication information, and the deletion indication information is used to indicate to delete (R)AN tunnel information of the same session; or the second request message is used to request to first deactivate the same session and then reactivate the same session.

Optionally, the first response message further carries identification information of a same session, the same session is a same session between the to-be-activated session and the active session of the terminal device, and the sending unit 1601 is further configured to send a second request message to an SMF node corresponding to the same session.

The second request message is used to request to activate the same session; or the second request message is used to request to activate the same session, the second request message carries deletion indication information, and the deletion indication information is used to indicate to delete (R)AN tunnel information of the same session; or the second request message is used to request to first deactivate the same session and then reactivate the same session.

Figure 17:
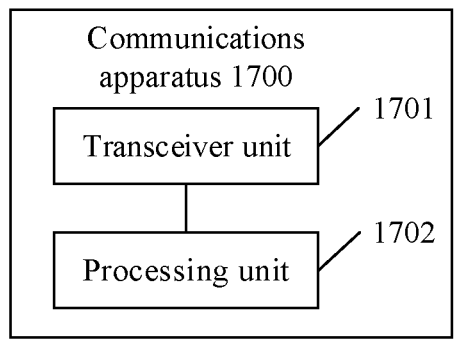
FIG. 17 is a schematic structural diagram of a communications apparatus according to a sixteenth embodiment of this application.

As shown in FIG. 17, a sixteenth embodiment of this application provides a communications apparatus 1700. The communications apparatus 1700 is applied to a scenario in which a terminal device moves from a first AN node to a second AN node. The first AN node is managed by a first AMF node, and the second AN node is managed by a second AMF node. The apparatus 1700 may be the first AMF node or be inside the first AMF node. For example, the apparatus 1700 may be configured to perform an action of the first AMF node in the embodiment shown in FIG. 7. The apparatus 1700 includes a transceiver unit 1701 and a processing unit 1702.

The transceiver unit 1701 is configured to receive a first request message from the second AMF node. The first request message is used to request a mobility management context of the terminal device, and the first request message carries identification information of a to-be-activated session of the terminal device.

The transceiver unit 1701 is further configured to send a first response message to the second AMF node. The first response message carries the mobility management context of the terminal device.

The processing unit 1702 is configured to send a context release command to the first AN node using the transceiver unit 1701 when a signaling connection of the terminal device exists between the first AMF node and the first AN node. The context release command is used to instruct to release a context of the terminal device.

The transceiver unit 1701 is further configured to receive a context release complete message from the first AN node. The context release complete message carries identification information of an active session of the terminal device.

The processing unit 1702 is further configured to: when the to-be-activated session and the active session have a same session, skip sending a second request message to an SMF node corresponding to the same session. The second request message is used to request to deactivate the same session.

Optionally, the processing unit 1702 is further configured to: when the to-be-activated session and the active session have a different session, send, using the transceiver unit 1701, a third request message to an SMF node corresponding to a session that is in the active session but not in the to-be-activated session, where the third request message is used to request to deactivate the session that is in the active session but not in the to-be-activated session.

Figure 18:
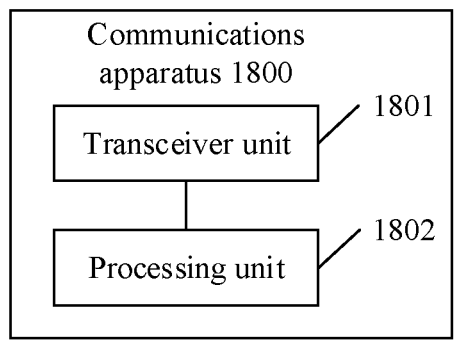
FIG. 18 is a schematic structural diagram of a communications apparatus according to a seventeenth embodiment of this application.

As shown in FIG. 18, a seventeenth embodiment of this application provides a communications apparatus 1800. The apparatus 1800 may be an SMF node or a chip or a system-on-a-chip in the SMF node. The apparatus 1800 may be configured to perform an action of the SMF node in the foregoing method embodiments. The apparatus 1800 includes a transceiver unit 1801 and a processing unit 1802.

The transceiver unit 1801 is configured to receive a request message from an AMF node. The request message is used to request to activate a session, and the request message carries deletion indication information. The deletion indication information is used to indicate to delete (R)AN tunnel information of the session.

The processing unit 1802 is configured to delete the (R)AN tunnel information of the session according to the deletion indication information.

The transceiver unit 1801 is further configured to send a response message to the AMF node. The response message carries core network tunnel information of the session.

Figure 19:
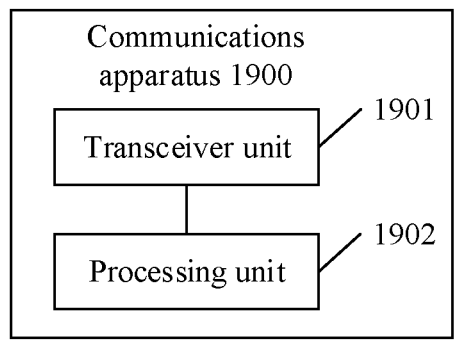
FIG. 19 is a schematic structural diagram of a communications apparatus according to an eighteenth embodiment of this application.

As shown in FIG. 19, an eighteenth embodiment of this application provides a communications apparatus 1900. The apparatus 1900 may be an SMF node or a chip or a system-on-a-chip in the SMF node. The apparatus 1900 may be configured to perform an action of the SMF node in the foregoing method embodiments. The apparatus 1900 includes a transceiver unit 1901 and a processing unit 1902.

The transceiver unit 1901 is configured to receive a request message from an AMF node. The request message is used to request to first deactivate a session and then reactivate the session.

The processing unit 1902 is configured to delete (R)AN tunnel information of the session based on the request message.

The transceiver unit 1901 is further configured to send a response message to the AMF node. The response message carries core network tunnel information of the session.

Figure 20:
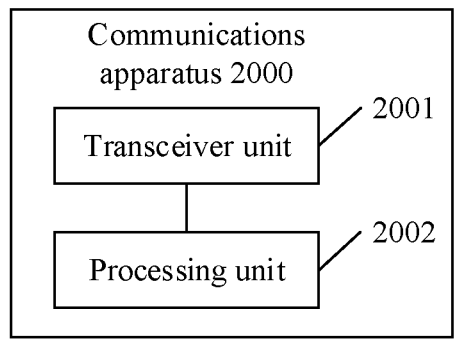
FIG. 20 is a schematic structural diagram of a communications apparatus according to a nineteenth embodiment of this application.

As shown in FIG. 20, a nineteenth embodiment of this application provides a communications apparatus 2000. The apparatus 2000 may be an SMF node or a chip or a system-on-a-chip in the SMF node. The apparatus 2000 may be configured to perform an action of the SMF node in the foregoing method embodiments. The apparatus 2000 includes a transceiver unit 2001 and a processing unit 2002.

The transceiver unit 2001 is configured to receive a request message from an AMF node. The request message is used to request to activate a session.

The processing unit 2002 is configured to delete (R)AN tunnel information of the session when the session is in an active state.

Optionally, the transceiver unit 2001 is further configured to send core network tunnel information of the session to the AMF node.

It should be noted that the units mentioned in the foregoing apparatus embodiments may be implemented in a form of hardware. For example, the transceiver unit may be a transceiver or a communications interface, the processing unit may be a processor, and both the receiving unit and the sending unit may be a communications interface or a transceiver. The units may be alternatively implemented in a form of a software function module.

Figure 21:
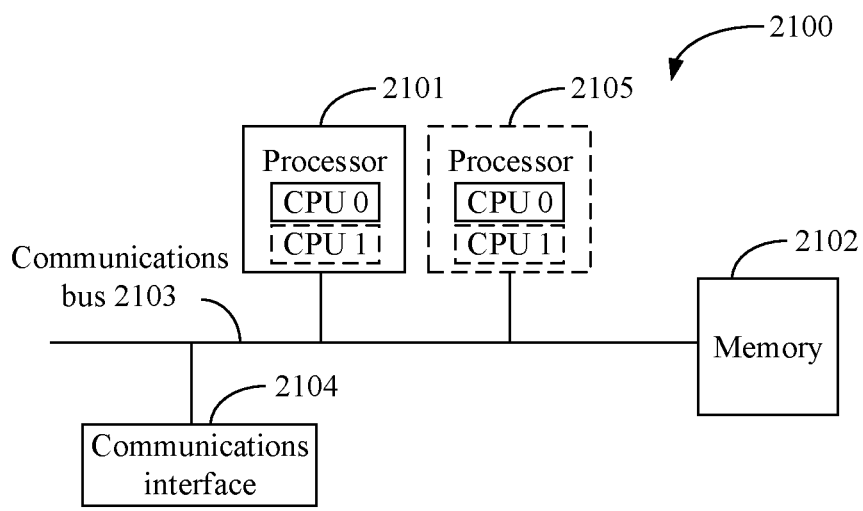
FIG. 21 is a schematic structural diagram of a communications apparatus according to a twentieth embodiment of this application.

As shown in FIG. 21, a twentieth embodiment of this application provides a schematic diagram of a communications apparatus 2100. The apparatus 2100 includes at least one processor 2101 and a memory 2102, and may further include a communications bus 2103 and at least one communications interface 2104. The apparatus 2100 may be any device in the embodiments of this application, and the apparatus 2100 may be configured to perform the methods provided in the embodiments of this application.

The processor 2101 may be a general-purpose central processing unit (CPU), a microprocessor, an application-specific integrated circuit (ASIC), or one or more integrated circuits for controlling program execution in solutions in this application.

The memory 2102 may be a read-only memory (ROM) or another type of static storage device capable of storing static information and instructions, or a random access memory (RAM) or another type of dynamic storage device capable of storing information and instructions; or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, and the like), a magnetic disk storage medium or another magnetic storage device, or any other medium capable of carrying or storing expected program code in a form of an instruction or a data structure and capable of being accessed by the apparatus 2100. However, the memory 2102 is not limited thereto. The memory may exist independently, and is connected to the processor using the bus 2103. Alternatively, the memory may be integrated with the processor.

The communications bus 2103 may include a channel for transferring information between the foregoing components.

The communications interface 2104 may be any apparatus like a transceiver, and is configured to communicate with another device or communications network, such as an Ethernet network, a RAN, or a WLAN.

The memory 2102 is configured to store program code, and the processor 2101 is configured to execute the program code stored in the memory 2102.

For example, the processor 2101 may include one or more CPUs such as a CPU 0 and a CPU 1 in FIG. 21.

For example, the apparatus 2100 may include a plurality of processors such as the processor 2101 and a processor 2105 in FIG. 21. Each of the processors may be a single-core (single-CPU) processor, or may be a multi-core (multi-CPU) processor. Herein, the processor may be one or more devices, a circuit, and/or a processing core used to process data (such as a computer program instruction).

For example, the apparatus 2100 shown in FIG. 21 may be a priority management device or a part of the priority management device, and one or more software modules are stored in the memory of the apparatus shown in FIG. 21. The apparatus 2100 shown in FIG. 21 may implement, by executing the program code in the memory using the processor, steps performed by the AMF node, the first AMF node, or the second AMF node in each embodiment of this application.

For example, the apparatus shown in FIG. 21 may be a service server or a part of the service server, and one or more software modules are stored in the memory of the apparatus shown in FIG. 21. The apparatus shown in FIG. 21 may implement, by executing the program code in the memory using the processor, steps performed by the SMF node in each embodiment of this application.

An embodiment of this application further provides a computer storage medium storing program code. When the program code is executed by a processor, the program code may be used to perform a step of a priority management device in each method embodiment.

An embodiment of this application further provides a computer storage medium storing program code. When the program code is executed by a processor, the program code may be used to perform a step of a service server (for example, a first service server or a second service server) in each method embodiment.

An embodiment of this application further provides a computer storage medium storing program code. When the program code is executed by a processor, the program code may be used to perform a step of a client in each method embodiment.

An embodiment of this application further provides a communications system. The communications system includes the communications apparatuses shown in FIG. 12 and FIG. 20, or includes the communications apparatuses shown in FIG. 20 and FIG. 13, or includes any communications apparatus shown in FIG. 18 to FIG. 20 and the communications apparatuses shown in FIG. 15 and FIG. 16, or includes the communications apparatuses shown in FIG. 17 and FIG. 20.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device integrating one or more usable media, such as a server or a data center. The usable medium may be a magnetic medium (for example, a floppy disk, a hard disk, or a magnetic tape), an optical medium (for example, DVD), a semiconductor medium (for example, a solid-state drive (SSD)), or the like.

What is claimed is:

1. A communication method, comprising:
   receiving, by a session management function node, a request message from an access control and mobility management function node, wherein the request message requests activation of a session;
   determining, by the session management function node before activating the session based on the request message, whether the session is in an active state; and
   deleting, in response to the session being in the active state, (radio) access network ((R)AN) tunnel information of the session.

2. The communication method of claim 1, wherein the request message is an update session management context request message.

3. The communication method of claim 2, wherein the update session management context request message carries activation indication information indicating that the update session management context request message requests to activate the session.

4. The communication method of claim 1, wherein the request message carries identification information of the session.

5. A communications apparatus, comprising:
   a memory configured to store instructions; and
   a processor in communication with the memory and configured to execute the instructions to:
   receive a request message from an access control and mobility management function node, wherein the request message requests activation of a session;
   determine, before activating the session based on the request message, whether the session is in an active state; and
   delete, in response to the session being in the active state, (radio) access network ((R)AN) tunnel information of the session.

6. The communications apparatus of claim 5, wherein the request message is an update session management context request message.

7. The communications apparatus of claim 6, wherein the update session management context request message carries activation indication information indicating that the update session management context request message requests to activate the session.

8. The communications apparatus of claim 5, wherein the request message carries identification information of the session.

9. A non-transitory computer-readable medium configured to store computer instructions, that when executed by one or more processors, cause the one or more processors to:
   receive a request message from an access control and mobility management function node, wherein the request message requests activation of a session;
   determine, before activating the session based on the request message, whether the session is in an active state; and
   delete, in response to the session being in the active state, (radio) access network ((R)AN) tunnel information of the session.

10. The non-transitory computer-readable medium of claim 9, wherein the request message is an update session management context request message.

11. The non-transitory computer-readable medium of claim 10, wherein the update session management context request message carries activation indication information indicating that the update session management context request message requests to activate the session.

12. A communication method, comprising:
    sending, by an access and mobility management function node, a request message to a session management function node, wherein the request message requests activation of a session;
    receiving, by the session management function node, the request message;
    determining, by the session management function node before activating the session based on the request message, whether the session is in an active state; and deleting, in response to the session being in the active state, (radio) access network ((R)AN) tunnel information of the to-be-activated session.

13. The communication method of claim 12, wherein the request message is an update session management context request message.

14. The communication method of claim 13, wherein the update session management context request message carries activation indication information indicating that the update session management context request message requests to activate the session.

15. The communication method of claim 12, wherein the request message carries identification information of the session.

* * * * *